US 6,861,809 B2

(12) United States Patent
Stam

(10) Patent No.: US 6,861,809 B2
(45) Date of Patent: Mar. 1, 2005

(54) HEADLAMP CONTROL TO PREVENT GLARE

(75) Inventor: Joseph S. Stam, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/235,476

(22) Filed: Sep. 5, 2002

(65) Prior Publication Data

US 2003/0107323 A1 Jun. 12, 2003

Related U.S. Application Data

(63) Continuation-in-part of application No. 10/197,834, filed on Jul. 18, 2002, now Pat. No. 6,593,698, which is a continuation of application No. 09/938,774, filed on Aug. 24, 2001, now Pat. No. 6,429,594, which is a continuation of application No. 09/546,858, filed on Apr. 10, 2000, now Pat. No. 6,281,632, which is a continuation of application No. 09/157,063, filed on Sep. 18, 1998, now Pat. No. 6,049,171.
(60) Provisional application No. 60/339,762, filed on Dec. 10, 2001.

(51) Int. Cl.$^7$ ............................. H05B 37/02; B60Q 1/02
(52) U.S. Cl. ........................ 315/82; 315/149; 250/208.1
(58) Field of Search ............................. 315/82, 77, 79, 315/83, 80, 81, 149; 250/208.1, 214, 211 R, 226, 205; 307/10.8

(56) References Cited

U.S. PATENT DOCUMENTS

| | | |
|---|---|---|
| 2,131,888 A | 10/1938 | Harris |
| 2,632,040 A | 3/1953 | Rabinow .................... 361/175 |
| 2,827,594 A | 3/1958 | Rabinow .................... 315/83 |
| 3,179,845 A | 4/1965 | Kulwiec |
| 3,581,276 A | 5/1971 | Newman |
| 3,663,819 A | 5/1972 | Hicks et al. |
| 4,139,801 A | 2/1979 | Linares ........................ 315/83 |
| 4,151,526 A | 4/1979 | Hinachi et al. |

(List continued on next page.)

FOREIGN PATENT DOCUMENTS

| | | |
|---|---|---|
| DE | 2946561 | 5/1981 |
| FR | 2641237 | 7/1990 |
| FR | 2726144 | 4/1996 |
| GB | 2 313 973 E | 11/1981 |
| JP | 57-44541 | 3/1982 |
| JP | 60-15237 | 1/1985 |
| JP | 60-015237 | 1/1985 |
| JP | 05-139203 | 6/1993 |
| JP | 06-151067 | 5/1994 |
| JP | 6-267304 | 9/1994 |
| JP | 6-295601 | 10/1994 |
| JP | 7-47878 | 2/1995 |
| JP | 7-052706 | 2/1995 |
| JP | 7-69125 | 3/1995 |
| JP | 8166221 | 6/1996 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Christopher M. Kormanyos, SAE Paper No. 980003, pp. 13–18.

(List continued on next page.)

Primary Examiner—Wilson Lee
Assistant Examiner—Chuc Tran
(74) Attorney, Agent, or Firm—Price, Heneveld, Cooper DeWitt & Litton LLP

(57) ABSTRACT

A system for controlling at least one exterior vehicle light of a controlled vehicle includes an array of sensors and a control unit. The array of sensors are capable of detecting light levels in front of the controlled vehicle. The control unit is in communication with the array of sensors and the at least one exterior vehicle light and determines a distance and an angle from the at least one exterior vehicle light of the controlled vehicle to a leading vehicle. The control unit is operable to control operation of the at least one exterior vehicle light as a function of the distance and angle, based on the output from the array of sensors, and prevent the at least one exterior vehicle light from providing a disruptive glare to a driver of the leading vehicle.

59 Claims, 13 Drawing Sheets

U.S. PATENT DOCUMENTS

| | | | |
|---|---|---|---|
| 4,236,099 A | 11/1980 | Rosenblum | 315/83 |
| 4,258,979 A | 3/1981 | Mahin | |
| 4,286,308 A | 8/1981 | Wolff | |
| 4,357,558 A | 11/1982 | Massoni et al. | 315/83 |
| 4,376,909 A | 3/1983 | Tagami et al. | 315/82 |
| 4,479,173 A | 10/1984 | Yoshioka et al. | |
| 4,599,544 A | 7/1986 | Martin | 315/83 |
| 4,645,975 A | 2/1987 | Meitzler et al. | |
| 4,665,321 A | 5/1987 | Chang et al. | 307/10.8 |
| 4,692,798 A | 9/1987 | Seko et al. | 348/118 |
| 4,716,298 A | 12/1987 | Etoh | |
| 4,727,290 A | 2/1988 | Smith et al. | 315/82 |
| 4,768,135 A | 8/1988 | Kretschmer et al. | 362/466 |
| 4,862,037 A | 8/1989 | Farber et al. | 315/83 |
| 4,891,559 A * | 1/1990 | Matsumoto et al. | 315/82 |
| 4,930,742 A | 6/1990 | Schofield et al. | 248/475.1 |
| 4,934,273 A | 6/1990 | Endriz | |
| 4,967,319 A | 10/1990 | Seko | 362/420 |
| 5,008,946 A | 4/1991 | Ando | |
| 5,036,437 A | 7/1991 | Macks | 362/465 |
| 5,072,154 A | 12/1991 | Chen | 315/82 |
| 5,086,253 A | 2/1992 | Lawler | 315/83 |
| 5,096,287 A | 3/1992 | Kakinami et al. | |
| 5,124,549 A | 6/1992 | Michaels et al. | 250/237 R |
| 5,166,681 A | 11/1992 | Bottesch et al. | |
| 5,182,502 A | 1/1993 | Slotkowski et al. | 315/159 |
| 5,187,383 A | 2/1993 | Taccetta et al. | 307/10.8 |
| 5,235,178 A | 8/1993 | Hegyi | 250/226 |
| 5,329,206 A | 7/1994 | Slotkowski et al. | 315/159 |
| 5,347,261 A | 9/1994 | Adell | |
| 5,347,459 A | 9/1994 | Greenspan et al. | |
| 5,355,146 A | 10/1994 | Chiu et al. | |
| 5,379,104 A | 1/1995 | Takao | |
| 5,396,054 A | 3/1995 | Krichever et al. | |
| 5,402,170 A | 3/1995 | Parulski et al. | |
| 5,416,318 A | 5/1995 | Hegyi | 250/226 |
| 5,426,294 A * | 6/1995 | Kobayashi et al. | 250/226 |
| 5,428,464 A | 6/1995 | Silverbrook | |
| 5,430,450 A | 7/1995 | Holmes | |
| 5,434,407 A | 7/1995 | Bauer et al. | 250/227.24 |
| 5,451,822 A * | 9/1995 | Bechtel et al. | 307/9.1 |
| 5,452,004 A | 9/1995 | Roberts | |
| 5,471,515 A | 11/1995 | Fossum et al. | 377/60 |
| 5,475,441 A | 12/1995 | Parulski et al. | |
| 5,481,268 A | 1/1996 | Higgins | |
| 5,483,346 A | 1/1996 | Butzer | |
| 5,485,155 A | 1/1996 | Hibino | |
| 5,508,592 A | 4/1996 | Lapatovich et al. | 315/248 |
| 5,537,003 A | 7/1996 | Bechtel et al. | 315/82 |
| 5,541,724 A | 7/1996 | Hoashi | |
| 5,550,677 A | 8/1996 | Schofield et al. | 359/604 |
| 5,554,912 A | 9/1996 | Thayer et al. | |
| 5,574,463 A | 11/1996 | Shirai et al. | |
| 5,587,929 A | 12/1996 | League et al. | |
| 5,592,146 A | 1/1997 | Kover, Jr. | |
| 5,614,788 A | 3/1997 | Mullins et al. | 315/82 |
| 5,621,460 A | 4/1997 | Hatlestad et al. | |
| 5,660,454 A | 8/1997 | Mori et al. | 362/466 |
| 5,666,028 A | 9/1997 | Bechtel et al. | 315/82 |
| 5,684,473 A | 11/1997 | Hibino et al. | |
| 5,707,129 A | 1/1998 | Kobayashi | |
| 5,710,565 A | 1/1998 | Shirai et al. | |
| 5,714,751 A | 2/1998 | Chen | |
| 5,715,093 A | 2/1998 | Schierbeek et al. | 359/601 |
| 5,736,816 A | 4/1998 | Strenke et al. | |
| 5,751,832 A | 5/1998 | Panter et al. | |
| 5,781,105 A | 7/1998 | Bitar et al. | |
| 5,786,787 A | 7/1998 | Eriksson et al. | |
| 5,796,094 A | 8/1998 | Schofield et al. | 250/208.1 |
| 5,798,727 A | 8/1998 | Shirai et al. | |
| 5,811,888 A | 9/1998 | Hsieh | 307/10.8 |
| 5,812,321 A | 9/1998 | Schierbeek et al. | 359/601 |
| 5,835,613 A | 11/1998 | Breed et al. | 382/100 |
| 5,837,994 A * | 11/1998 | Stam et al. | 250/208.1 |
| 5,841,126 A | 11/1998 | Fossum et al. | 250/208.1 |
| 5,845,000 A | 12/1998 | Breed et al. | |
| 5,867,214 A | 2/1999 | Anderson et al. | |
| 5,877,897 A | 3/1999 | Schofield et al. | 359/604 |
| 5,905,457 A | 5/1999 | Rashid | |
| 5,912,534 A | 6/1999 | Benedict | 315/82 |
| 5,923,027 A | 7/1999 | Stam et al. | 250/208.1 |
| 5,942,853 A | 8/1999 | Piscart | 315/82 |
| 5,990,469 A * | 11/1999 | Bechtel et al. | 250/208.1 |
| 6,008,486 A | 12/1999 | Stam et al. | 250/208.1 |
| 6,018,308 A | 1/2000 | Shirai | |
| 6,049,171 A * | 4/2000 | Stam et al. | 315/82 |
| 6,097,023 A | 8/2000 | Schofield et al. | 250/208.1 |
| 6,102,546 A | 8/2000 | Carter | |
| 6,130,421 A | 10/2000 | Bechtel et al. | 250/208.1 |
| 6,140,933 A | 10/2000 | Bugno et al. | |
| 6,144,158 A | 11/2000 | Beam | 315/82 |
| 6,166,698 A | 12/2000 | Turnbull et al. | 343/713 |
| 6,184,781 B1 | 2/2001 | Ramakesavan | |
| 6,255,639 B1 * | 7/2001 | Stam et al. | 250/208.1 |
| 6,281,632 B1 * | 8/2001 | Stam et al. | 315/82 |
| 6,329,925 B1 | 12/2001 | Skiver et al. | 340/425 |
| 6,349,782 B1 | 2/2002 | Sekiya et al. | |
| 6,356,376 B1 | 3/2002 | Tonar et al. | |
| 6,379,013 B1 * | 4/2002 | Bechtel et al. | 359/604 |
| 6,396,040 B1 * | 5/2002 | Hill | 250/205 |
| 6,396,397 B1 | 5/2002 | Bos et al. | 340/461 |
| 6,403,942 B1 * | 6/2002 | Stam | 250/214 AL |
| 6,442,465 B2 | 8/2002 | Breed et al. | |
| 6,443,602 B1 * | 9/2002 | Tanabe et al. | 362/465 |
| 6,465,962 B1 | 10/2002 | Fu et al. | |
| 6,469,739 B1 * | 10/2002 | Bechtel et al. | 348/302 |
| 6,483,438 B2 | 11/2002 | DeLine et al. | |
| 6,507,779 B2 | 1/2003 | Breed et al. | |
| 6,617,564 B2 | 9/2003 | Yoshioka | |
| 2002/0040962 A1 | 4/2002 | Schoefield et al. | 250/208.1 |

OTHER PUBLICATIONS

Franz–Josef Kalze, SAE Paper No. 980005, pp. 23–26.
J.P. Löwenau et al., SAE Paper No. 980007, pp. 33–38.
Tohru Shimizu et al., SAE Paper No. 980322, pp. 113–117.

* cited by examiner

ND GLARE

CROSS-REFERENCE TO RELATED APPLICATIONS

This application claims the benefit of U.S. Provisional Patent Ser. No. 60/339,762, entitled "HEADLAMP CONTROL TO PREVENT GLARE," which was filed Dec. 10, 2001, and which is hereby incorporated herein by reference in its entirety.

This application is a continuation-in-part of U.S. patent application Ser. No. 10/197,834, entitled "CONTINUOUSLY VARIABLE HEADLAMP CONTROL," filed Jul. 18, 2002, now U.S. Pat. No. 6,593,698, which is a continuation of U.S. patent application Ser. No. 09/938,774, entitled "CONTINUOUSLY VARIABLE HEADLAMP CONTROL," filed on Aug. 24, 2001, by Joseph S. Stam et al., now U.S. Pat. No. 6,429,594, which is a continuation of U.S. patent application Ser. No. 09/546,858, entitled "CONTINUOUSLY VARIABLE HEADLAMP CONTROL," filed on Apr. 10, 2000, by Joseph S. Stam et al., now U.S. Pat. No. 6,281,632, which is a continuation of U.S. patent application Ser. No. 09/157,063, entitled "CONTINUOUSLY VARIABLE HEADLAMP CONTROL," filed on Sep. 18, 1998, by Joseph S. Stam et al., now U.S. Pat. No. 6,049,171. The entire disclosure of each of the above-noted applications is incorporated herein by reference. Priority under 35 U.S.C. §120 is hereby claimed to the filing dates of each of the above-identified applications.

This application is related to U.S. patent application Ser. No. 10/208,142, entitled "LIGHT SOURCE DETECTION AND CATEGORIZATION SYSTEM FOR AUTOMATIC VEHICLE EXTERIOR LIGHT CONTROL AND METHOD OF MANUFACTURING," filed on Jul. 30, 2002, and which is hereby incorporated herein by reference in its entirety.

BACKGROUND OF THE INVENTION

The present invention is generally directed to controlling exterior vehicle lights of a motor vehicle and, more specifically, to controlling exterior vehicle lights of a motor vehicle so as to reduce glare to occupants of other motor vehicles and/or pedestrians, as well as providing optimal lighting for various roads/environmental conditions.

Currently, rearview mirror glare from trailing vehicles is a significant safety and nuisance concern, while driving at night. Sport utility vehicles (SUVs) and trucks, which generally have headlamps mounted much higher than passenger vehicles, may provide a much higher level of rearview glare than typical passenger cars. This glare may be especially disruptive in busy traffic situations where an SUV or truck is following a small passenger car. As a result of the glare experienced by drivers of passenger cars, when closely followed by an SUV or truck, various solutions, such as reducing the mounting height limit of headlamps, have been proposed to help alleviate this problem. Unfortunately, solutions such as reducing the mounting height limit of an SUV or truck's headlamps may generally require an objectionable change to the front end styling of the SUV or truck. Additionally, the physical construction of large SUVs and trucks may make it impossible to reduce the mounting height significantly.

Thus, what is needed is a technique for reducing the glare caused by low-beam headlamps of SUVs and trucks that does not involve lowering the mounting height of low-beam headlamps of the SUV/truck. Further, it would be desirable for the technique to function with both leading and on-coming vehicles and be applicable to all vehicle types, roads and environmental conditions.

SUMMARY OF THE INVENTION

An embodiment of the present invention is directed to a system for controlling at least one exterior vehicle light of a controlled vehicle and includes an array of sensors and a control unit. The array of sensors is capable of detecting light levels in front of the controlled vehicle. The control unit is in communication with the array of sensors and the at least one exterior vehicle light and determines an approximate distance and an angle from the at least one exterior vehicle light of the controlled vehicle to a leading vehicle. The control unit is also operable to control operation of the at least one exterior vehicle light as a function of the distance and angle, based on output from the array of sensors, and prevent the at least one exterior vehicle light from providing disruptive glare to a driver of the leading vehicle.

According to another embodiment of the present invention, an illumination control system for controlling at least one exterior vehicle light of a controlled vehicle includes an array of sensors and a control unit. The array of sensors generates electrical signals that are provided to the control unit, which is in communication with the at least one exterior vehicle light. The control unit is operable to acquire and process electrical signals received from the array of sensors to determine an illumination gradient associated with the at least one exterior vehicle light on a road surface. The control unit compares a sensed illumination range, which is based on the illumination gradient, to a desired illumination range and is operable to control the at least one exterior vehicle light to achieve a desired illumination range.

According to another embodiment of the present invention, an illumination control system for controlling at least one exterior vehicle light of a controlled vehicle includes a discrete light sensor and a control unit. The discrete light sensor generates electrical signals, which are provided to the control unit, which is in communication with the at least one exterior vehicle light. The control unit is operable to acquire and process electrical signals from the discrete light sensor to determine when the at least one exterior vehicle light should transition to a town lighting mode. The discrete light sensor provides an indication of an AC component present in ambient light and the control unit causes the at least one exterior vehicle light to transition to the town lighting mode when the AC component exceeds a predetermined AC component threshold.

According to still another embodiment of the present invention, an illumination control system for controlling the at least one exterior vehicle light of a controlled vehicle includes an imaging system and a control unit. The imaging system obtains an image to a front of the controlled vehicle and includes an array of sensors, which each generate electrical signals that represent a light level sensed by the sensor. The control unit is in communication with the at least one exterior vehicle light and is operable to acquire electrical signals received from the array of sensors and to separately process the electrical signals. The control unit is operable to examine a position and brightness of an on-coming vehicle headlamp over time, as indicated by the electrical signals provided by the array of sensors, to determine when a median width is appropriate for the activation of a motorway lighting mode and causes the at least one exterior vehicle light to transition to the motorway lighting mode responsive to the determined median width.

In another embodiment, an illumination control system for controlling at least one exterior vehicle light of a controlled vehicle includes an imaging system, a spatially controlled variable attenuating filter and a control unit. The imaging system obtains an image to a front of the controlled vehicle and includes an array of sensors that each generate electrical signals representing a light level sensed by the sensor. The filter is positioned approximate the at least one exterior vehicle light and the control unit is in communication with the at least one exterior vehicle light and the filter. The control unit is operable to acquire electrical signals received from the array of sensors and to process the electrical signals and control the filter to vary an illumination range of the at least one exterior vehicle light in response to the electrical signals and to control the filter to distinguish between vehicular and non-vehicular light sources.

In one embodiment, an illumination control system for controlling at least one exterior vehicle light of a controlled vehicle includes an imaging system, a spatially controlled reflector and a control unit. The imaging system obtains an image to a front of the controlled vehicle and includes an array of sensors that each generate electrical signals representing a light level sensed by the sensor. The reflector is positioned approximate the at least one exterior vehicle light and the control unit is in communication with the at least one exterior vehicle light and the reflector. The control unit is operable to acquire electrical signals received from the array of sensors and to process the electrical signals and control the reflector to vary an illumination range of the at least one exterior vehicle light in response to the electrical signals and to control the reflector to distinguish between vehicular and non-vehicular light sources.

In another embodiment, a system for controlling at least one headlamp of a controlled vehicle includes an array of sensors and a control unit. The array of sensors is capable of detecting light levels in front of the controlled vehicle and the control unit is in communication with the array of sensors and the at least one headlamp. The headlamp has a high color temperature and the control unit receives data representing the light levels detected by the array of sensors to identify potential light sources and distinguish light that is emitted from the headlamp and reflected by an object from other potential light sources. The control unit is also operable to control operation of the at least one headlamp as a function of the light levels output from the array of sensors.

In yet another embodiment a controllable headlamp includes at least one light source and a spatially controlled variable attenuating filter positioned approximate the at least one light source. The filter is controlled to provide a variable illumination range for the at least one light source and is controlled to distinguish between vehicular and non-vehicular light sources.

In still another embodiment, a controllable headlamp includes at least one light source and a spatially controlled reflector positioned approximate the at least one light source. The reflector is controlled to provide a variable illumination range for the at least one light source and is controlled to distinguish between vehicular and non-vehicular light sources.

These and other features, advantages and objects of the present invention will be further understood and appreciated by those skilled in the art by reference to the following specification, claims and appended drawings.

DETAILED DESCRIPTION OF THE PREFERRED EMBODIMENTS

The present invention is directed to a system for controlling at least one exterior vehicle light (e.g., low-beam headlamps, high-beam headlamps, tail lamps, fog lamps, etc.) of a controlled vehicle and includes an array of sensors and a control unit. The control unit is in communication with the array of sensors and the at least one exterior vehicle light and is capable of determining a distance and an angle from the at least one exterior vehicle light of the controlled vehicle to a leading vehicle. The control unit is operable to control operation of the at least one exterior vehicle light as a function of the distance and angle, based on the output from the array of sensors, and prevent the at least one exterior vehicle light from providing disruptive glare to a driver of the leading vehicle.

In another embodiment of the present invention, an illumination control system for controlling the at least one exterior vehicle light of a controlled vehicle includes an array of sensors and a control unit. The control unit is operable to acquire and process electrical signals received from the array of sensors to determine an illumination gradient associated with the at least one exterior vehicle light on a road surface. The control unit compares a sensed illumination range, which is based on the illumination gradient, to a desired illumination range and is operable to control the at least one exterior vehicle light to achieve a desired illumination range.

In yet another embodiment of the present invention, an illumination control system for controlling the at least one exterior vehicle light of a controlled vehicle includes a discrete light sensor and a control unit. The control unit is operable to acquire and process electrical signals from the discrete light sensor, which provides an indication of an AC component present in ambient light. The control unit causes the at least one exterior vehicle light to transition to the town lighting mode when the AC component exceeds a predetermined AC component threshold.

According to still another embodiment of the present invention, an illumination control system for controlling the at least one exterior vehicle light of a controlled vehicle includes an imaging system and a control unit. The imaging system obtains an image to a front of the controlled vehicle and includes an array of sensors which each generate electrical signals that represent a light level sensed by the sensor. The control unit is operable to examine a position and brightness of an on-coming vehicle headlamp over time, as indicated by the electrical signals provided by the array of sensors, to determine when a median width is appropriate for the activation of a motorway lighting mode.

Figure 1A:
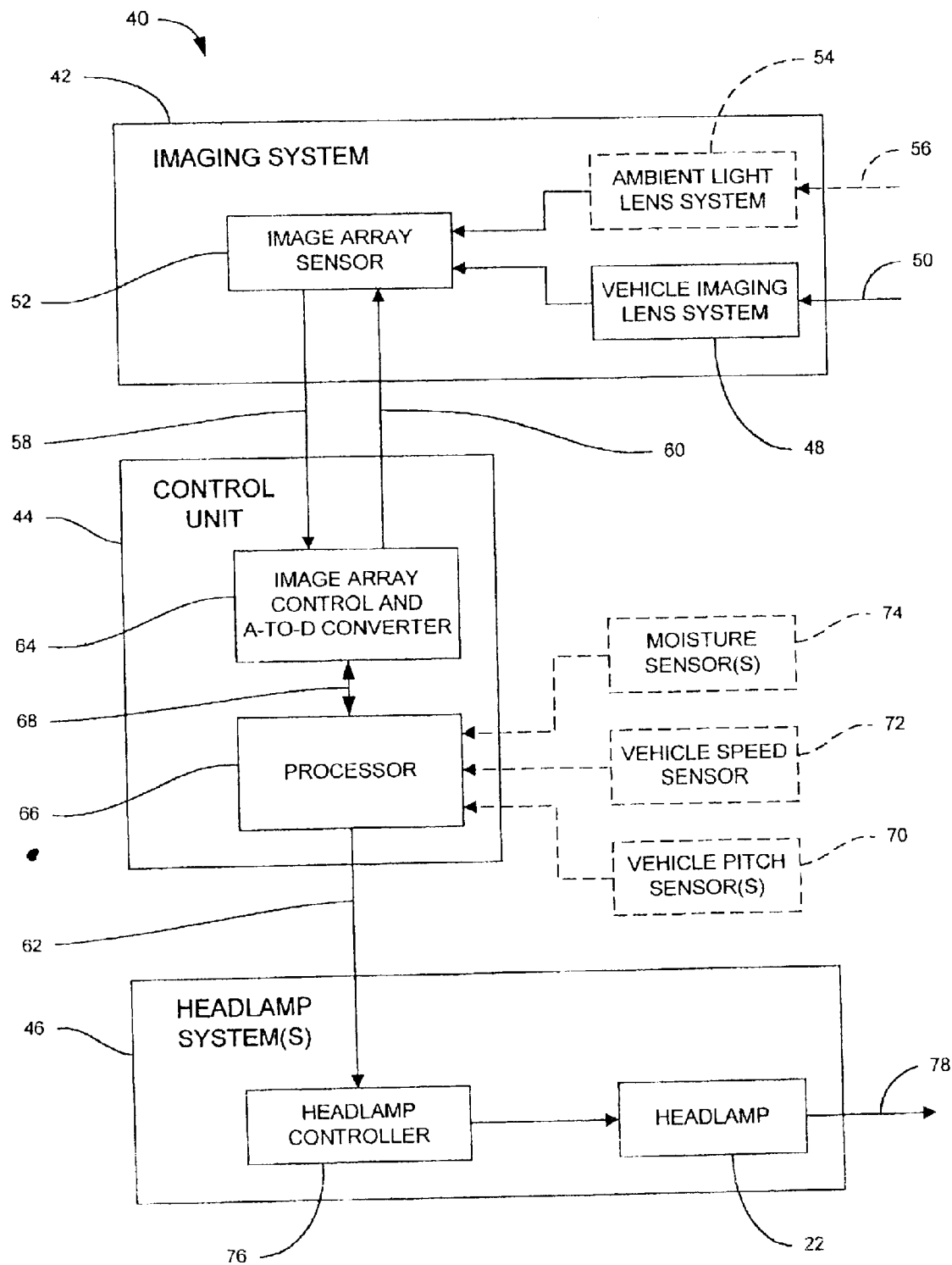
FIG. 1A is an electrical block diagram of an exemplary imaging system.

Referring now to FIG. 1A, a block diagram of a control system according to an embodiment of the present invention is shown. A control system 40 for continuously variable headlamps includes imaging system 42, control unit 44 and at least one continuously variable headlamp system 46. The control unit 44 may take various forms, such as a microprocessor including a memory subsystem with an application appropriate amount of volatile and non-volatile memory, an application specific integrated circuit (ASIC) or a programmable logic device (PLD). The imaging system 42 includes vehicle imaging lens system 48 operative to focus light 50 from a region generally in front of a controlled vehicle onto image array sensor 52. The imaging system 42 is capable of determining lateral and elevational locations of headlamps from on-coming vehicles and tail lamps of leading vehicles. The vehicle imaging lens system 48 may include two lens systems, one lens system having a red filter and one lens system having a cyan filter, which permits the image array sensor 52 to simultaneously view a red image and a cyan image of the same region in front of the controlled vehicle and thereby discriminate between tail lamps and headlamps. The image array sensor 52 may include an array of pixel sensors.

The imaging system 42 may include an ambient light lens system 54 operable to gather light 56 over a wide range of elevational angles for viewing by a portion of the image array sensor 52. Alternatively, the light 50, focused through the vehicle imaging lens system 48, may be used to determine ambient light levels. Additionally, a light sensor completely separate from the imaging system 42 may be used to determine ambient light levels. In one embodiment, the imaging system 42 is incorporated into an interior rearview mirror mount. In this case, the imaging system 42 may be aimed through a portion of the windshield of the controlled vehicle that is cleaned by at least one windshield wiper.

The control unit 44 accepts pixel gray scale levels 58 and generates image sensor control signals 60 and headlamp illumination control signals 62. The control unit 44 includes an imaging array control and analog-to-digital converter (ADC) 64 and a processor 66. The processor 66 receives digitized image data from and sends control information to the imaging array control and ADC 64, via serial link 68.

The control system 40 may include vehicle pitch sensors 70, to detect the pitch angle of a controlled vehicle relative to the road surface. Typically, two of the vehicle pitch sensors 70 are desired. Each of the sensors 70 are mounted on the chassis of the controlled vehicle, near the front or rear axle, and a sensor element is fixed to the axle. As the axle moves relative to the chassis, the sensor 70 measures either rotational or linear displacement. To provide additional information, the control unit 44 may also be connected to a vehicle speed sensor 72, one or more moisture sensors 74 and may also be connected to a GPS receiver, a compass transducer and/or a steering wheel angle sensor.

Precipitation such as fog, rain or snow may cause excessive light from headlamps 22 to be reflected back to the driver of the controlled vehicle. Precipitation may also decrease the range at which on-coming vehicles and leading vehicles may be detected. Input from the moisture sensor 74 may therefore be used to decrease the full range of illumination.

A headlamp controller 76 controls at least one of the continuously variable headlamps 22. When multiple headlamp controllers 76 are utilized, each of the headlamp controllers 76 accepts the headlamp illumination control signals 62, from control unit 44, and affects the headlamps 22 accordingly to modify an illumination range of light 78 leaving headlamp 22. Depending on the type of continuously variable headlamp 22 used, the headlamp controller 76 may vary the intensity of the light 78 leaving the headlamp 22, may vary the direction of the light 78 leaving the headlamp 22, or both.

The control unit 44 may acquire an image covering a glare area, which includes points at which a driver of an on-coming vehicle or leading vehicle would perceive the headlamps 22 to cause excessive glare. The control unit 44 processes the image to determine if at least one vehicle is within the glare area. If at least one vehicle is within the glare area, the control unit 44 changes the illumination range. Otherwise, the headlamps 22 are set to a full illumination range.

The changes to illumination range and setting the headlamps 22 to a full illumination range typically occur gradually as sharp transitions in the illumination range may startle the driver of the controlled vehicle, since the driver may not be aware of the precise switching time. A transition time of between one and two seconds is desired for returning to full illumination range from dimmed illumination range, corresponding to low-beam headlamps. Such soft transitions in illumination range also allow the control system 40 to recover from a false detection of an on-coming vehicle or leading vehicle. Since image acquisition time is approximately 30 ms, correction may occur without the driver of the controlled vehicle noticing any change.

For a controlled vehicle with both high-beam and low-beam headlamps 22, reducing illumination range may be accomplished by decreasing the intensity of high-beam headlamps 22 while increasing the intensity of low-beam headlamps 22. Alternately, low-beam headlamps can be left on continuously for ambient light levels below a certain threshold. For a controlled vehicle with at least one headlamp 22 having a variable horizontal aimed direction, the aim of headlamp 22 may be moved away from the direction of an on-coming vehicle when the illumination range is reduced or changed. This allows the driver of the controlled vehicle to better see the edge of the road, road signs, pedestrians, animals and the like that may be on the curb side of the controlled vehicle. The control unit 44 may determine if any leading vehicle is in a curb lane on the opposite side of the controlled vehicle from on-coming traffic. If a leading vehicle is not in the curb lane, reducing the illumination range may include aiming headlamps 22 away from the direction of on-coming traffic. If a leading vehicle is detected in a curb lane, the illumination range may be reduced without changing the horizontal aim of headlamps 22.

Automatic Aiming of Low-Beam Headlamps to Prevent Glare to Other Vehicles

Figure 1B:
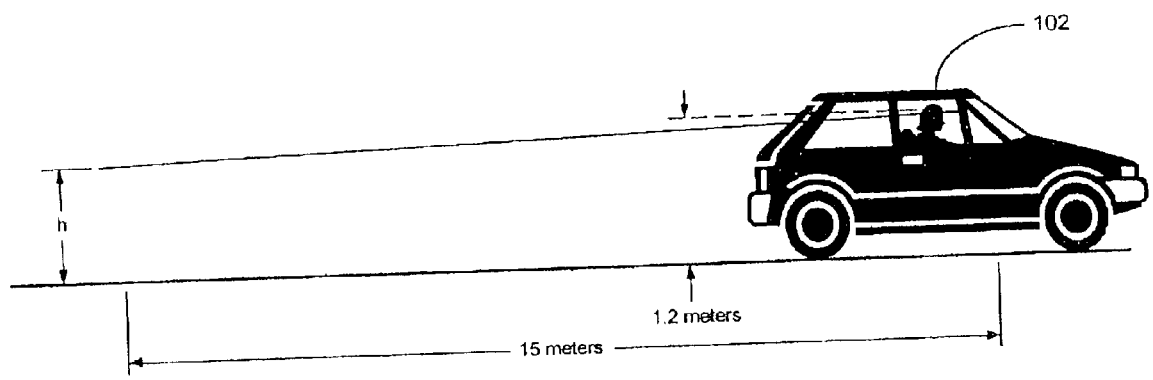
FIG. 1B is a side view of a leading vehicle illustrating various geometric considerations.

Set forth below are some computational examples that illustrate the relative rearview glare increase provided by high mounted low-beam headlamps over standard passenger car low-beam headlamps, as seen by a leading vehicle. These examples are approximate computations only and are not the result of specific measurements. The computations assume no obstruction between the low-beam headlamp of a trailing vehicle and the rearview mirror surface of the leading vehicle and do not account for rear window transmission loss. FIG. 1B depicts a leading vehicle 102 that is being followed by a trailing vehicle (not shown) at a distance of about 15 meters, with respect to low-beam headlamps of the trailing vehicle and an internal rearview mirror of the leading vehicle.

The illumination at the leading vehicle's interior rearview mirror, located about 1.2 meters above the road, is determined by: computing the horizontal and vertical angle to each of the headlamps (assuming a headlamp separation of about 1.12 m), determining the intensity of the headlamps at that angle and dividing the determined intensity by the distance squared. Information on the average position of automotive rearview mirrors can be obtained from a paper entitled "Field of View in Passenger Car Mirrors," by M. Reed, M. Lehto and M. Flannagan (published by the University of Michigan Transportation Research Institute (UMTRI-2000-23)), which is hereby incorporated herein by reference in its entirety. Information on the intensity of average low-beam headlamps can be obtained from a paper entitled "High-Beam and Low-Beam Headlighting Patterns in the U.S. and Europe at the Turn of the Millennium," by B. Schoettle, M. Sivak and M. Flannagan (published by UMTRI (UMTRI 2001-19)), which is also hereby incorporated herein by reference in its entirety.

Figure 2:
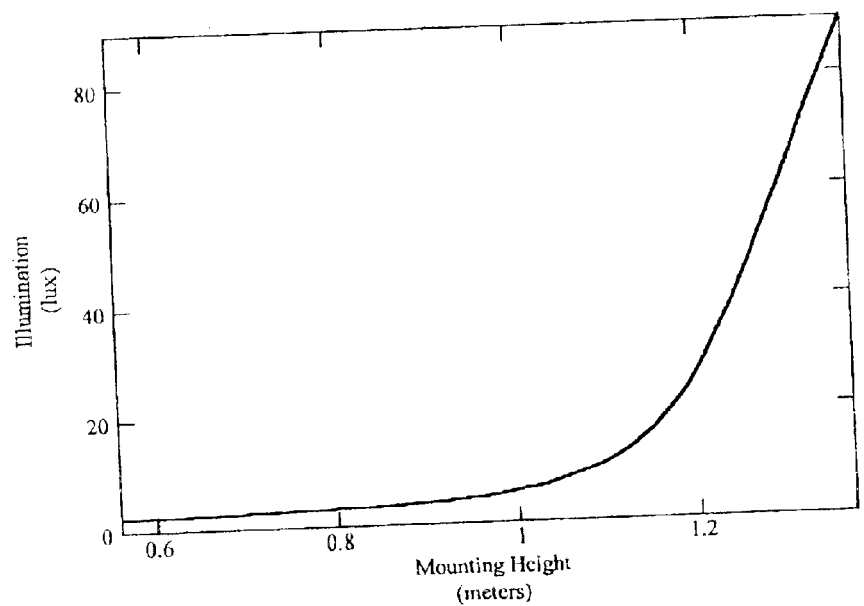
FIG. 2 is a graph depicting the illumination, as a function of the mounting height of a trailing vehicle's low-beam headlamps, on a surface at a rearview mirror position of the leading vehicle of FIG. 1B.

FIG. 2 is a graph that depicts the illumination (as a function of mounting height of the trailing vehicle's low-beam headlamps) on a surface at the rearview mirror position of a leading vehicle, assuming no obstructions and based on the information set forth above. The graph of FIG. 2 illustrates the low-beam headlamp mounting height over the legal range, specified in FMVSS 108, of 0.56 meters to 1.37 meters. A typical passenger car may have headlamps mounted at about 0.62 meters. In this case, the glare on the rearview mirror of the leading vehicle is about 2.4 lux. For a vehicle with headlamps mounted at 1 meter, the glare on the rearview mirror of the leading vehicle increases to 5.8 lux. The situation becomes much more severe with large trucks and SUVs with low-beam headlamp mounting heights higher than 1 meter. At the current U.S. maximum headlamp mounting height, i.e., 1.37 meters, the glare at the rearview mirror is approximately 91 lux. This large increase is due to the fact that the intensity of low-beam headlamps is greatest at about 1.5 degrees below horizontal and decreases rapidly with increased vertical angle.

Figure 3:
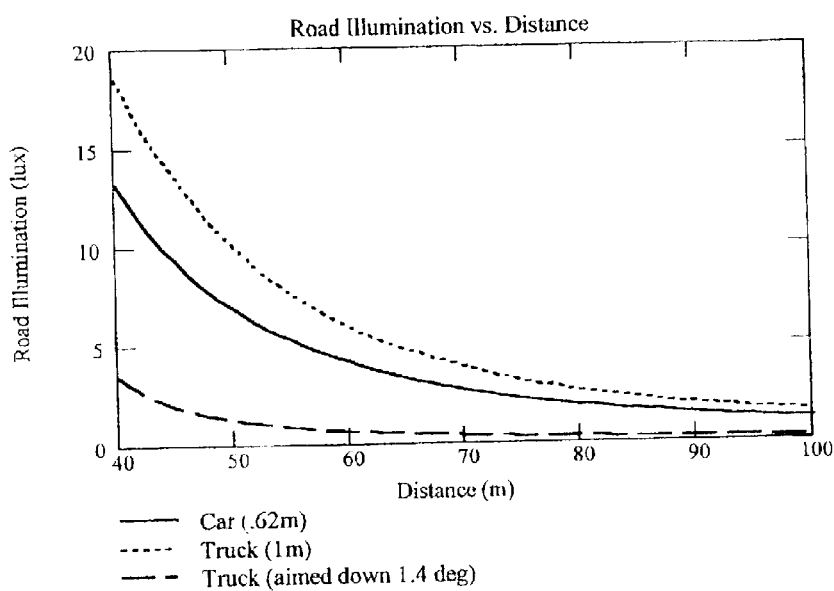
FIG. 3 is a graph illustrating road surface illumination as a function of distance for various headlamp mounting heights.

The problem of increased rearview mirror glare with increased headlamp mounting height could be solved by requiring manufacturers of larger vehicles to aim their headlamps further downward when they are mounted above a predetermined height. However, this solution comes at the cost of decreased illumination range during normal driving, when no leading vehicle is present. For example, in order for a vehicle with headlamps mounted at 1 meter to produce the glare equivalent of a vehicle with headlamps mounted at 0.62 meters (i.e., at 15 meters), the vehicle whose headlamps are mounted at 1 meter must be aimed downward an additional 1.4 degrees. FIG. 3 depicts three curves of road illumination as a function of distance for: a passenger car with low-beam headlamps mounted at 0.62 meters, a truck or SUV with low-beam headlamps mounted at 1 meter and a truck or SUV with low-beam headlamps mounted at 1 meter and aimed downward an additional 1.4 degrees. As is shown in FIG. 3, the downward aim reduces the visibility distance of the low-beam headlamps significantly. As a result, simply aiming the headlamps down is generally unacceptable during normal driving conditions, when no leading vehicle is present.

Additional information about the effects of mirror glare resulting from different mounting heights can be found in Society of Automotive Engineers (SAE) publication J2584 entitled "Passenger Vehicle Headlamp Mounting Height," which is also hereby incorporated herein by reference in its entirety. This study recommends that headlamp mounting height be limited to 0.85 meters to avoid projecting undue glare into leading vehicles.

A solution which limits the glare to leading vehicles, while preserving the desired mounting height of the headlamps, involves detecting the presence of leading vehicles and adjusting the aim of the low-beam headlamps of the trailing vehicle, accordingly. Systems to vary the aim of headlamps are currently commercially available on many production vehicles. These systems typically use sensors in the axles of a vehicle to detect changes in road pitch and vary the aim of the headlamps to insure a constant visibility distance. Other systems provide motors for adjustment of the aim of the headlamps, but rely on the driver to manually adjust the aim of the headlamps through a manual adjustment knob located in the vehicle. Although such systems were not designed or used in conjunction with a means to detect a leading vehicle to automatically reduce the angle of the headlamps, when such vehicles are detected, such systems can be used for this purpose.

In one embodiment, such a leading vehicle detection means may include a camera (i.e., an array of sensors) and an image processing system as is described in U.S. Pat. No. 6,281,632 entitled "CONTINUOUSLY VARIABLE HEADLAMP CONTROL," issued Aug. 28, 2001, to Joseph S. Stam et al., which is hereby incorporated herein by reference in its entirety, and PCT Application No. PCT/US01/08912, entitled "SYSTEM FOR CONTROLLING EXTERIOR VEHICLE LIGHTS," published Sep. 27, 2001 (WO 01/70538), which is also hereby incorporated herein by reference in its entirety. Such systems are capable of detecting the tail lamps of leading vehicles and may determine the approximate distance to a leading vehicle by the brightness of the tail lamps in an image or by the separation distance between the two tail lamps of the leading vehicle. Since tail lamps are typically mounted below the rear window of most vehicles, the tail lamps' position in the image can also be used to determine if excess glare is likely to be projected into the rearview mirror of the leading vehicle.

Figure 4:
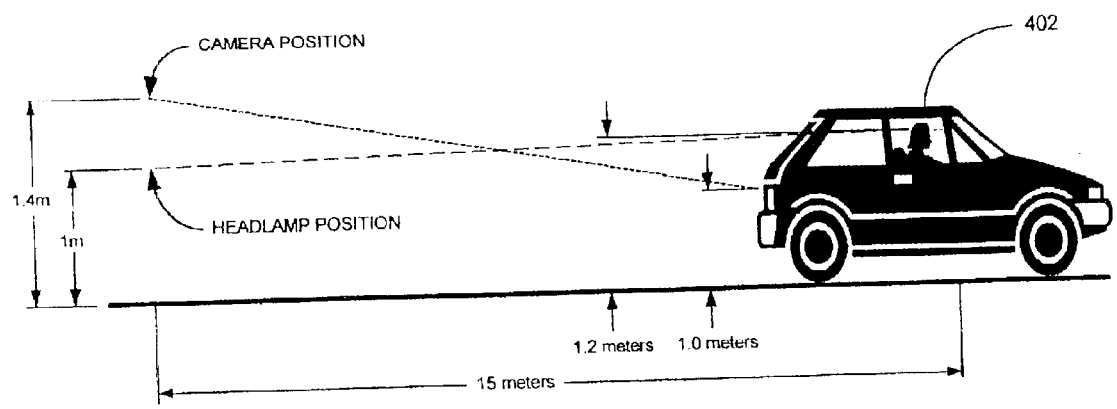
FIG. 4 is a side view of another leading vehicle illustrating various geometric considerations.

FIG. 4 depicts a leading vehicle 402 (with tail lamps located 1 meter above the road) whose rearview mirror is 15 meters ahead of low-beam headlamps of a trailing vehicle (not shown). The angle between the tail lamps of the leading vehicle and the camera of the trailing vehicle can be determined from the position of the tail lamps in the image. It should be appreciated that the difference in mounting height between a camera mounted within a vehicle and low-beam headlamps of the vehicle is fixed and, therefore, can be known for any given vehicle. As mentioned above, the distance to the leading vehicle can be determined in a number of ways. For example, the distance to the leading vehicle can be estimated by the brightness of the tail lamps of the leading vehicle in the image. Alternatively, for most vehicles with two tail lamps, the distance between the two tail lamps, which remains within a reasonable range for production vehicles, can be used to estimate the distance to the leading vehicle. For motorcycles or vehicles with only one tail lamp, brightness can be used to estimate the distance between the trailing and leading vehicles. Finally, other devices for determining distance, such as a radar, laser or ultrasonic sensors, may be used. Such systems are already incorporated in many production vehicles for use in conjunction with, for example, parking aids and adaptive cruise control systems. For an example of one such system see U.S. Pat. No. 6,403,942, entitled "AUTOMATIC HEADLAMP CONTROL SYSTEM UTILIZING RADAR AND AN OPTICAL SENSOR," the entire disclosure of which is hereby incorporated herein by reference.

Once an estimate of the distance from the trailing vehicle to the leading vehicle is determined, the angle between the controlled vehicle's headlamps and the leading vehicle (e.g., the rearview mirror of the leading vehicle) can be determined. A detailed method for analyzing an image to determine the location of light sources within an image is set forth in PCT Application No. PCT/US01/08912. Then, if the trailing vehicle is close enough to the leading vehicle for glare to disrupt the driver of the leading vehicle, the aim of the headlamps can be set downward to a level which does not cause disruptive glare (alternatively, or in addition, the intensity of the headlamps may be adjusted). When no leading vehicles are within a close range, the headlamps of the trailing vehicle can be aimed normally for proper road illumination. Modifications to the above embodiment may include a variety of methods for reducing the intensity of light directed towards the detected light source. These methods include, but are not limited to: modifying the horizontal direction aim of the headlamps, modifying the vertical direction aim of the headlamps, modifying the intensity of the headlamps, enabling or disabling one of a plurality of exterior lights and selectively blocking or attenuating light from the exterior lights in the direction of the detected light source.

Automatic Aiming of Headlamps Using an Image Sensor

As headlamp technology improves and vehicle headlamps have become brighter, the potential for causing glare to on-coming and leading drivers has become greater. Low-beam headlamps, which are designed to prevent glare to on-coming drivers, are typically aimed 1.5 degrees downward and about 1.5 degrees right, with a sharp reduction in intensity above the peak. However, variations in the road and in vehicle loading can regularly cause the peak of these headlamps to shine directly into the eyes of an on-coming driver. This problem becomes much more severe with new technology headlamps, such as high-intensity discharge (HID) headlamps, and, as a result, various groups have attempted to design systems that perform active leveling of these brighter headlamps. Current automatic leveling systems provide sensors on each axle to determine the pitch of the vehicle, relative to the road. Such systems may also incorporate vehicle speed sensing to anticipate variations in vehicle pitch with acceleration. These systems require that the headlamp aiming, relative to the vehicle, be known and calibrated to properly aim the headlamps to compensate for vehicle pitch variations.

An embodiment of the present invention generally improves on prior automatic headlamp leveling systems by sensing the actual beam pattern, provided by, for example, the low-beam headlamps, on the road separately, or in combination with the sensing of the vehicle's pitch. By looking at the illumination gradient on the road, it is possible to compare the actual illumination range to the desired illumination range and compensate for variance by adjusting the headlamp's aim. The desired illumination range may be constant or may be a function of the current vehicle speed, ambient light level, weather conditions (rain/fog/snow), the presence or absence of other vehicles, the type of roadway or other vehicle and/or environmental conditions. For example, a driver of a vehicle traveling at a high rate of speed may benefit from a longer illumination range, while drivers traveling in fog may benefit from headlamps aimed lower. Because road reflectance is generally variable, it is not normally sufficient to look only at the illumination on the road to determine the illumination range. Rather, it is generally useful to look at the light level gradient with increasing distance on the road surface.

As is shown in FIG. 3, road illumination decreases as the distance from the vehicle increases. By looking at a vertical strip of pixels in the image corresponding to a particular horizontal angle and a range of vertical angles and comparing the change in brightness across this strip to an appropriate curve in FIG. 3, based on the mounting height of the low-beam headlamps for a particular vehicle, the current aim of the headlamps can be determined and adjusted to provide a desired illumination range. Alternatively, a vertical linear array of photosensors can be used to image road illumination and, thus, provide the road illumination gradient.

Further, in certain circumstances, reflections from lane markings can be used to indicate when a road bend is ahead of the controlled vehicle such that a direction of the headlamps of the controlled vehicle can be controlled to bend with the road. Alternatively, in vehicles that include a navigation system, e.g. a land-based system (such as Loran) or satellite-based system (such as a global positioning system (GPS)), a direction of the headlamps of the controlled vehicle can be varied based on a location of the vehicle.

Control of AFS Lighting Using an Image Sensor

Adaptive front lighting systems (AFSs) are a new generation of forward lighting systems, which contain a variety of technologies for improving a vehicle's forward illumination. In addition to standard low and high-beams, AFS lighting systems may include, for example, the following illumination modes:

bending lights—lamps in which the aim is varied horizontally or separate lamps are lit to provide better illumination when turning;

bad weather lights—lamps which provide good spread illumination on the road immediately in front of a vehicle to aid the driver in seeing obstacles in rain and fog;

motorway lighting—lamps which provide a greater illumination range at higher speeds when traveling on a motorway (i.e., a road with lanes in opposite directions separated by a median); and town lighting—lamps with a shorter and wider illumination range appropriate for driving in town and reducing glare to pedestrians and other drivers.

The goal of a typical AFS lighting system is to provide automatic selection of the different lighting modes. For example, rain sensing or fog sensing can be used to activate bad weather lights and steering wheel angle can be used to activate bending lights. However, the activation of the other illumination modes is not as straight forward. That is, activation of motorway lighting modes and town lighting modes requires a knowledge of the environment. Vehicle speed can be used to activate town lighting; however, it is possible that the illumination range may be unnecessarily reduced when traveling at a low speed out of town. Also, ambient light level may be a useful indication of traveling in a town. Finally, as is disclosed in U.S. patent application Ser. No. 09/800,460, entitled "SYSTEM FOR CONTROLLING EXTERIOR LIGHTS," now U.S. Pat. No. 6,587,573, which is hereby incorporated herein by reference in its entirety, a vehicle including a global positioning system (GPS) with a map database indicating the types of roads on which a vehicle is traveling may be used to determine a proper mode of lighting. However, such systems are expensive and map data may not be available for all areas of the world. Additionally, inaccuracies in GPS systems may occasionally cause such a system to incorrectly identify the road on which a vehicle is traveling.

According to the present invention, a town is detected through the use of an optical sensor. A discrete light sensor such as that described in PCT Application No. PCT/US00/00677, entitled "PHOTODIODE LIGHT SENSOR," by Robert H. Nixon et al. and published Jul. 27, 2000 (WO 00/43741), which is hereby incorporated herein by reference in its entirety, may be utilized. This sensor may be used to measure the ambient light and also measure the 120 Hz (or 100 Hz in Europe) intensity ripple component, produced by discharge street lighting powered by a 60 Hz AC source, by obtaining several light level measurements during different phases of the intensity ripple. If there is a significant AC component in the ambient light level and the vehicle speed is low (for example, less than 30 mph) it is likely that the vehicle is traveling in a town with significant municipal lighting and town lighting can be activated. By examining the quantity of AC lights and the vehicle's speed, town driving conditions can be accurately determined. The magnitude of the AC component may be used in combination with the ambient light level and the vehicle's speed to make a proper determination of the use of town lighting. For example, if the ambient light level is sufficient such that there would not be a significant safety risk from the reduced illumination range, the speed of the vehicle is indicative of driving in a town (e.g., below about 30 mph) and there is a significant AC component in the ambient lighting, town lighting may be activated.

Alternatively, the transition from normal low-beam lighting to town lighting may be continuous with the illumination range being a continuous function of ambient lighting and vehicle speed so as to produce a sufficient illumination range for given conditions. This provides the benefit of ensuring a safe illumination range and minimizing the glare to pedestrians or other vehicles. Finally, as an alternative to the use of a discrete light sensor, a sensor array, such as an image sensor, may be used to identify street lamps and activate town lighting if the number of streetlamps detected in a period of time exceeds a threshold (along with consideration of the vehicle's speed and ambient lighting). Methods for detecting streetlamps using an image sensor are described in detail in the above incorporated patent and patent application. The light sensor may be provided in various places throughout a motor vehicle, e.g., provided in a rearview mirror housing. Further, such a light sensor may also be used for various other functions (e.g., sun load), such as those set forth in U.S. Pat. No. 6,379,013, entitled "VEHICLE EQUIPMENT CONTROL WITH SEMICONDUCTOR LIGHT SENSORS," which is hereby incorporated herein by reference in its entirety.

Figure 5:
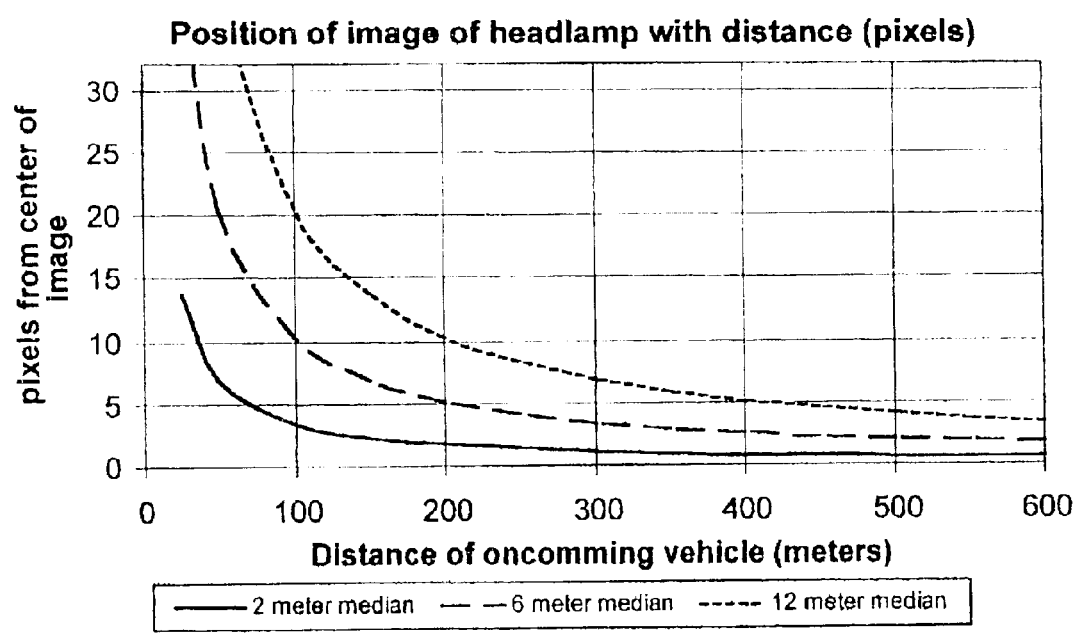
FIG. 5 is a graph depicting the relationship of the position of an on-coming headlamp image, with respect to a center of the image, as captured by an array of sensors in a controlled vehicle, as a function of distance to an on-coming vehicle for various median widths.

Motorway conditions can be also be determined by using an image sensor to detect the lane separation or median of a motorway. This can be accomplished by directly looking at the angular movement of the headlamps of on-coming vehicles in several subsequent images. The detection of the movement of an object in a series of images is further described in U.S. patent application Ser. No. 09/799,310 entitled "IMAGE PROCESSING SYSTEM TO CONTROL VEHICLE HEADLAMPS OR OTHER VEHICLE EQUIPMENT," filed Mar. 5, 2001, to Joseph S. Stam et al., now U.S. Pat. No. 6,631,316, which is hereby incorporated herein by reference in its entirety, FIG. 5 illustrates three curves, which represent different motorway median widths, and how the position of an on-coming headlamp in an image varies as a function of the distance between two vehicles that are traveling in different directions are converging. By examining the position and brightness of the headlamp in an image and by examining how the position of the headlamp image varies over time for the given controlled vehicle's speed, the approximate spacing of the median can be determined and motorway lighting can be activated if the median is of a sufficient width. Finally, if no headlamps are present, and no tail lamps of leading vehicles are present, high-beams can be activated.

Headlamp with Controllable Beam Pattern

Figure 6A:
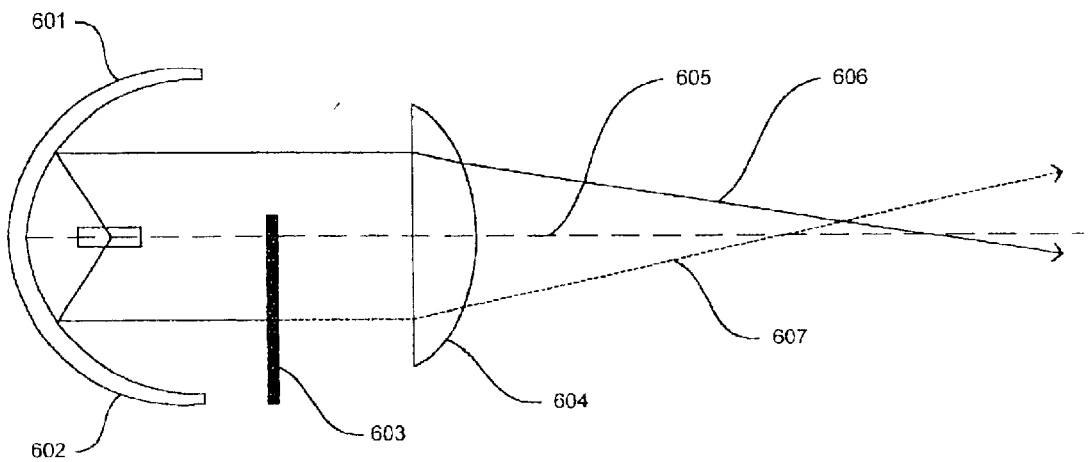
FIG. 6A is a side view of a high-performance headlamp that implements a mask, according to an embodiment of the present invention.
Figure 6B:
FIG. 6B is a front view of the mask of FIG. 6A.

FIG. 6A schematically illustrates an exemplary high-performance headlamp, commonly referred to as a projector headlamp, which is utilized in conjunction with a mask 603. A bulb 602 is placed in front of a reflector 601. The bulb 602 may be of a conventional incandescent (e.g., tungsten-halogen) type, high-intensity discharge (HID) type or other suitable bulb type, or may be the output from a remote light source as is described further below. A lens 604 directs light from the bulb 602 and reflected by the reflector 601 down the road. The mask 603 establishes a cutoff point to prevent light above the horizon 605 from being directed down the road. The mask 603 absorbs or reflects light rays, such as light ray 607, which would cause glare to another vehicle. Light rays, such as light ray 606, which project below the cutoff point, pass through lens 604 as they are not blocked by the mask 603. The mask 603, typically, has a shape, such as that shown in FIG. 6B, which contains a step allowing a slightly higher cutoff point to the right of the vehicle.

A modification to this type of lamp construction includes a solenoid to control the mask 603. Using the solenoid, the mask 603 can be removed from the position in front of the bulb 602. When removed, rays, such as the ray 607, project through the lens 604 and down the road, thus, establishing a much longer illumination range. In this way, the lamp with mask 603 removed can function as a high-beam headlamp.

Figure 6C:
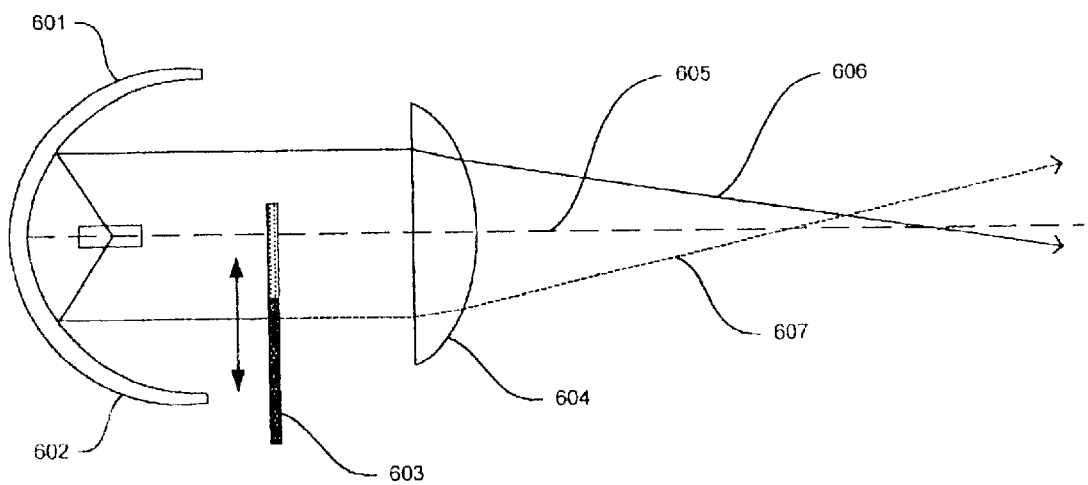
FIG. 6C is a side view of a high-performance headlamp that implements a mask, according to another embodiment of the present invention.

In the present invention, the mask 603 may also be controlled by a motor to move vertically relative to the bulb 602, lens 604 and reflector 601, as shown in FIG. 6C. By lowering the mask 603, the cutoff angle is raised and the illumination range is extended. By raising the mask 603, the cutoff angle is lowered and illumination range is reduced. The movement of the mask 603 can be used to establish different lighting functions, such as town or motorway lighting, or to increase the illumination range gradually with increased speed. Additionally, the movement of the mask 603 can also be used to establish the vertical aim of the headlamp and therefore compensate for vehicle pitch variations as described herein above. This method of aiming the headlamp is advantageous because only the relatively small mask 603 requires movement, rather than the entire lamp set which is moved in some auto-leveling systems today.

In another embodiment of the present invention, the mask 603 is replaced with a spatially controlled variable attenuating filter. This filter can be formed as an electrochromic variable transmission window, which has the capability to selectively darken various regions of the window. This window may contain a liquid or solid state (e.g., tungsten oxide) electrochromic material that is capable of withstanding the high temperatures achieved in close proximity to the bulb. Alternatively, this window may be a liquid crystal device (LCD), a suspended particle device or other electrically, chemically or mechanically variable transmission device. A suitable electrochromic device is disclosed in U.S. Pat. No. 6,020,987 entitled "ELECTROCHROMIC MEDIUM CAPABLE OF PRODUCING A PRESELECTED COLOR," which is hereby incorporated herein by reference in its entirety.

Figure 7A:
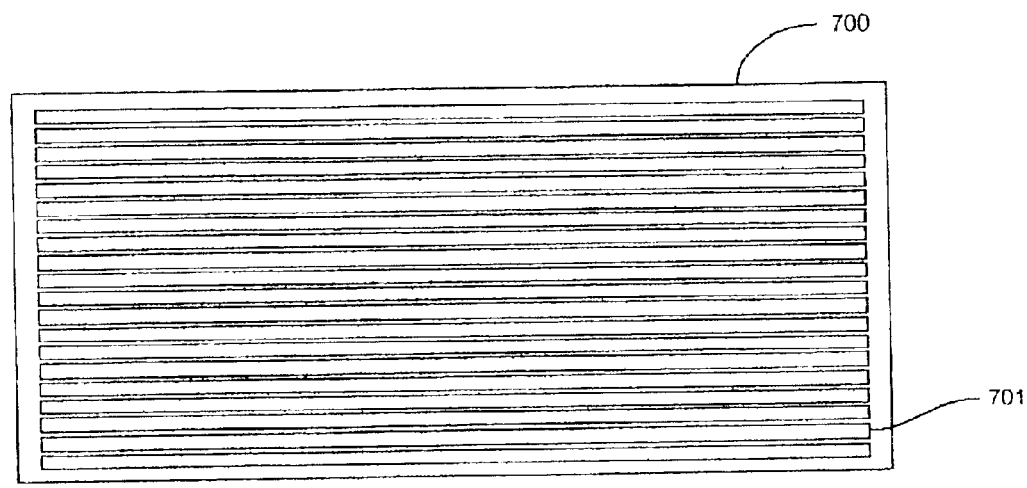
FIGS. 7A–7B are front views of variable transmission devices that are used to control the illumination produced by headlamps of a vehicle, according to an embodiment of the present invention.
Figure 7B:
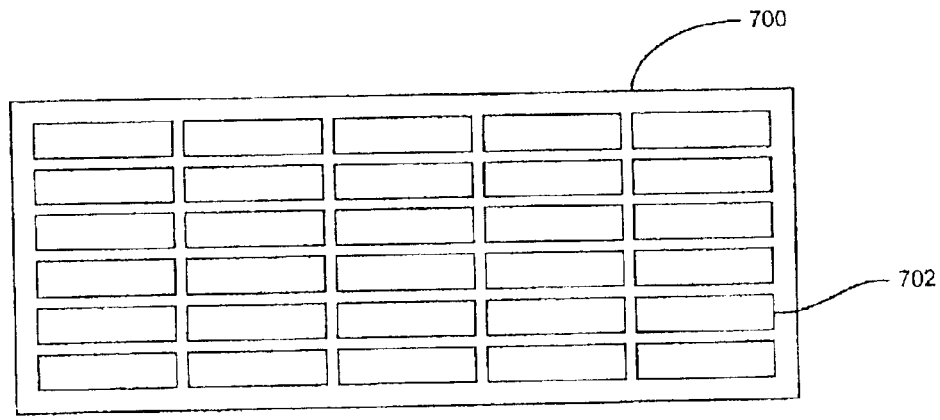

An example of such a variable transmission device 700 is shown in FIGS. 7A and 7B. The device 700 is constructed using two pieces of glass with electrochromic material contained between. On the inner surface of each piece of glass is a transparent conductive electrode, such as indium tin oxide (ITO), which is patterned on at least one of the surfaces to selectively darken different regions of the window by electronic control. In FIG. 7A, these regions are horizontal strips 701, which may optionally contain a slight step. By selectively darkening all the of strips 701, below a certain level, a variable cutoff can be achieved analogous to moving the mask 603 up or down as previously described with reference to FIG. 6C. While there is some space shown for clarity between each of the strips 701, in practice, this spacing is very small. Therefore, the absorbing region below the cutoff is essentially contiguous. Finally, it is possible to only partially darken the various stripes, thereby forming a more gradual cutoff.

Alternatively, the window 700 may contain several independently controlled blocks 702 as shown in FIG. 7B. There may be any number of blocks, depending on the granularity of control that is desired. By selectively darkening these blocks, almost any desired beam pattern can be achieved. For example, all blocks below a cutoff may be darkened to achieve a low-beam pattern. All blocks may be transparent to achieve a high-beam pattern. If an on-coming or preceding vehicle is detected by an image sensor, as previously described, blocks can be selectively darkened to block light corresponding to the angles at which the vehicle is detected and thereby glare to this vehicle can be prevented without compromising the illumination to the remainder of the forward field. Further, as used herein, distinct beam patterns may be achieved in various manners, e.g., changing the intensity or one or more light sources, changing the aiming direction of one or more light sources, changing the distribution of light provided by one or more light sources and/or activating multiple light sources in combination.

Yet another alternative is for mask 603 to be constructed as a spatially controlled reflector. Such a reflector may be a reversible electrochemical reflector, such as that described in U.S. Pat. Nos. 5,903,382; 5,923,456; 6,166,847; 6,111,685 and 6,301,039, the entire disclosures of which are hereby incorporated herein by reference. In such a device, a reflective metal is selectively plated and de-plated on a surface to switch between a reflective and transmissive state. A metal-hydride switchable mirror, available from Phillips electronics, may also be used to provide a spatially controlled reflector. The spatially controlled reflector may be formed as a single contiguous reflector, allowing for a switch from high to low-beam or may be patterned, such as in FIGS. 7A and 7B, to allow activation of individual segments of the mirror and, thus, provide spatial control of the transmitted beam. The use of a spatially controlled mirror provides the advantage that a reflective device reflects light rays 607 back into reflector 601 and, thus, these rays are conserved, rather than absorbed and, as such, are available to be projected in other areas of the beam. This provides a headlamp with improved efficiency, as compared to headlamps that absorb light rays to provide a desired illumination pattern. Additionally, by reflecting light rays, rather than absorbing the light rays, the mask may not become as hot and, thus, the headlamp becomes potentially more robust.

Figure 9:
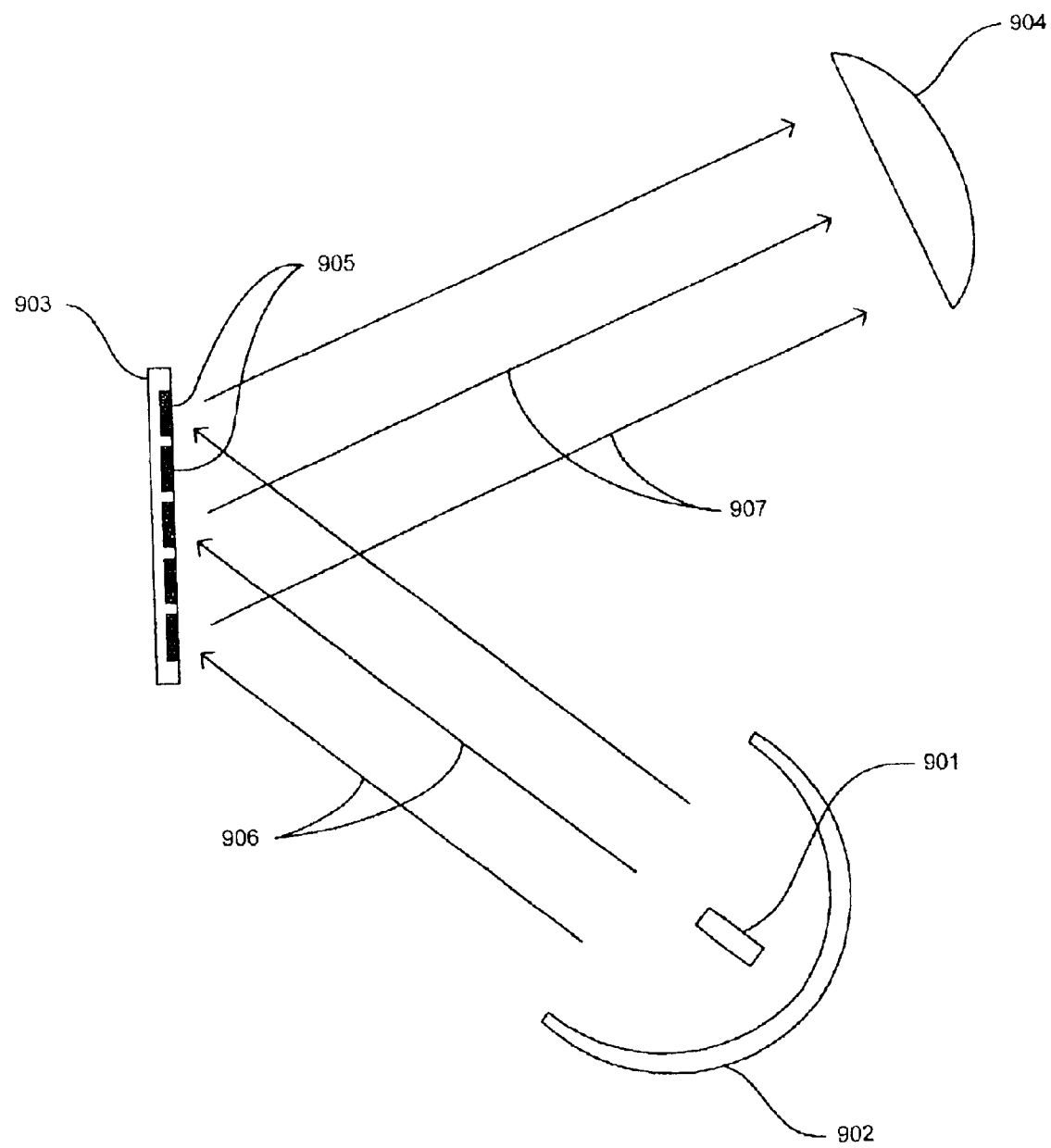
FIG. 9 is a diagram of a headlamp that utilizes a spatially controlled reflector.

In yet another embodiment, a spatially controlled reflector is used to construct a headlamp in accordance with FIG. 9. A bulb 901 and reflector 902 form a light source, which projects incident rays 906 onto a spatially controlled reflector 903. The light source may be any type of light source suitable for automotive use, such as a halogen source, a high-intensity discharge (HID) source or a light emitting diode (LED) source. Incident rays 906 may also come from a remote light source through a fiber bundle or light pipe. The spatially controlled reflector 903 contains a plurality of switchable mirrors 905, which can be turned on and which reflect incident rays 906 (as reflected rays 907), which are then projected by lens 904 down the road. When turned off, the incident rays 906 are reflected away from the lens 904, transmitted through the reflector 903 or absorbed and, thus, not projected by the lens 904. Alternatively, the rays may be redirected to increase the illumination of other portions of a headlamp beam.

The spatially controlled reflector may be, for example, a custom designed digital micro-mirror device (DMD) available from Texas Instruments. DMDs are micro-machined arrays of tiny mirrors which can be switched between two angles and are currently widely used for video projectors. The application of a DMD to produce a spatially configurable headlamp is analogous to that of a video projector.

However, high resolution, variable color and video frame rates that are necessary for video projectors are not necessary in a headlamp that utilizes a DMD. Thus, a control system for a headlamp can be simpler than a control system for a video projector. However, the present invention is not limited to any particular number of mirrors or switching rate. As few as one mirror for switching between two beam patterns to many thousands of mirror segments for providing a completely configurable beam pattern may be used.

As an alternative to a DMD, the spatially controlled reflector may be constructed as a reversible electro-chemical reflector or a metal-hydride switchable mirror as described above. Finally, a solid mirror with a patterned attenuating filter (such as an electrochromic filter or LCD) placed in front of the mirror may be used to provide the same function. It should be appreciated that controllable reflectors and/or attenuators may be used to select a beam pattern, based upon one or more driving conditions, at which point a control unit (based upon input received from a sensor array) may cause the reflector and/or attenuator to redirect or inhibit light that would cause glare to a sensed object. As is described herein, systems implementing a control unit in conjunction with a sensor array are configurable to distinguish between reflected light and light from another light source, through manipulation of a light source or sources of a controlled vehicle headlamp. In general, the light source(s) of the headlamp embodiments of FIGS. 8 and 9 can be cycled such that reflected light can be distinguished from light from another light source. Further, depending upon the construction of the headlamp, the embodiment of FIGS. 7A–7B may also be cycled to distinguish reflected light from light from another light source.

The embodiment of FIG. 9 generally functions in a similar manner as the previously described embodiments. By selecting which mirrors or mirror segments are on, the on/off duty cycle of the mirror segments, or if the mirror segments are continuously variable, the reflectance levels of any conceivable beam pattern can be achieved. The lamp can provide a basic low-beam function and/or provide high-beams, bending lamps, motorway lighting, bad weather lighting or any intermediate state. Additionally, when used with a camera to detect the direction to other vehicles, mirrors can be turned off to prevent light rays in that direction from being projected and, thus, glaring the other vehicle. Further, as mentioned above, the mirrors may be controlled such that reflected light, e.g., a non-vehicular light source can be distinguished from light provided by another light source, e.g., a vehicular light source.

Figure 8:
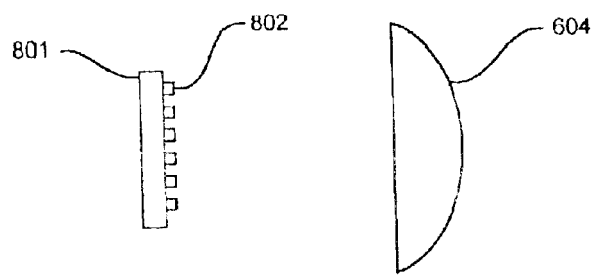
FIG. 8 is a side view of a headlamp that includes a plurality of individual light emitting diodes.

Yet another headlamp configuration suitable for use with the present invention is described with reference to FIG. 8. In this embodiment, the reflector 601, bulb 602, and mask 603 are replaced by a high-intensity LED array 801, which is placed approximately in the focal plane of the lens 604. High intensity LED arrays suitable for use as automotive headlamps are described in PCT application PCT/US01/08912, previously incorporated herein by reference, and in U.S. patent application Ser. No. 09/835,238 to Roberts et al., filed Apr. 13, 2001. These arrays may produce white light illumination through a binary-complementary combination of amber and blue-green LED emitters.

LEDs 802 or groups of LEDs 802 in the LED array 801 are configured to be independently, and optionally variably, energized by electronic control unit. The light from LEDs 802 (or groups of closely spaced LEDs) is projected to a particular region in front of the lamp by the lens 604. By selectively energizing these LEDs 802, a desired beam pattern can be achieved in a fashion similar to that achieved by selectively darkening various blocks 702 in the previously described embodiment of FIG. 7B. For example, all LEDs below a cutoff point may be energized to produce a desired illumination range. If other vehicles are identified by an imaging system, LEDs which project light in the direction of the identified vehicle may be shut off or reduced in intensity to prevent glare to the vehicle. All other LEDs may remain lit to provide illumination in regions where no vehicles are present. Further, in headlamps incorporating LEDs, a portion of the LEDs can be dimmed or turned off to distinguish on-coming vehicles from other light sources, such as reflectors.

The above described embodiments provide headlamps with a controllable and reconfigurable beam pattern. These headlamps may be used with the methods described above to provide a fully automatic vehicle forward light system, which can provide numerous functions, including: low-beams, high-beams, motorway lighting, town lighting, bad weather lighting, bending lamps, auto leveling and anti-glare control to prevent glare to on-coming or preceding drivers. These particular lighting modes are only exemplary and control may switch between discrete modes or may be continuous.

A variety of sensors may provide input to a control system to determine the appropriate beam pattern for the given driving conditions. These sensors may include, for example, a camera, ambient light sensor, speed sensor, steering wheel angle sensor, temperature sensor, compass, a navigation system (e.g., a land-based (such as Loran) or satellite-based (such as GPS), pitch sensors and various user input switches. Additionally, it is envisioned that a driver input may be provided for setting various preferences, such as the thresholds for switching between various beam patterns, the brightness of the lamps, the sharpness of beam cutoffs, the color of the lamps, the degree of bending, etc. A GPS, user input or factory setting may be provided to indicate the location of the vehicle to ensure compliance with various laws. Thus, identical lamp assemblies may be used in various countries with a simple selection of location.

The control methods described herein may be utilized with the lamp embodiments described herein or with other lamp types. Similarly, the lamp embodiments described herein may be controlled by a variety of methods, including those described herein, those described in other references incorporated herein or other methods. Finally, the lamp embodiments described herein may be used alone, in any number or configuration, or in conjunction with standard lamps, fixed bending lamps, fog lamps, foul weather lamps or other types of lamps. The control methods may control both the configurable lamps and any other type of lamp.

In one embodiment of the present invention, various external vehicle lights are used, such as high-intensity discharge (HID) headlamps, tungsten-halogen and blue-enhanced halogen headlamps, to provide greater ability to distinguish reflections from various roadside reflectors and signs from headlamps of on-coming vehicles and tail lamps of leading vehicles. Additionally, specific spectral filter material may be employed in combination with the external vehicle lights to produce desired results.

It is generally desirable for an automatic vehicle exterior light control system to distinguish headlamps of on-coming vehicles and tail lamps of leading vehicles from non-vehicular light sources or reflections off of signs and roadside reflectors. The ability to distinguish these various objects may be enhanced with optimal combination of various color, ultra-violet and infrared spectral filters. FIG.

Figure 10:
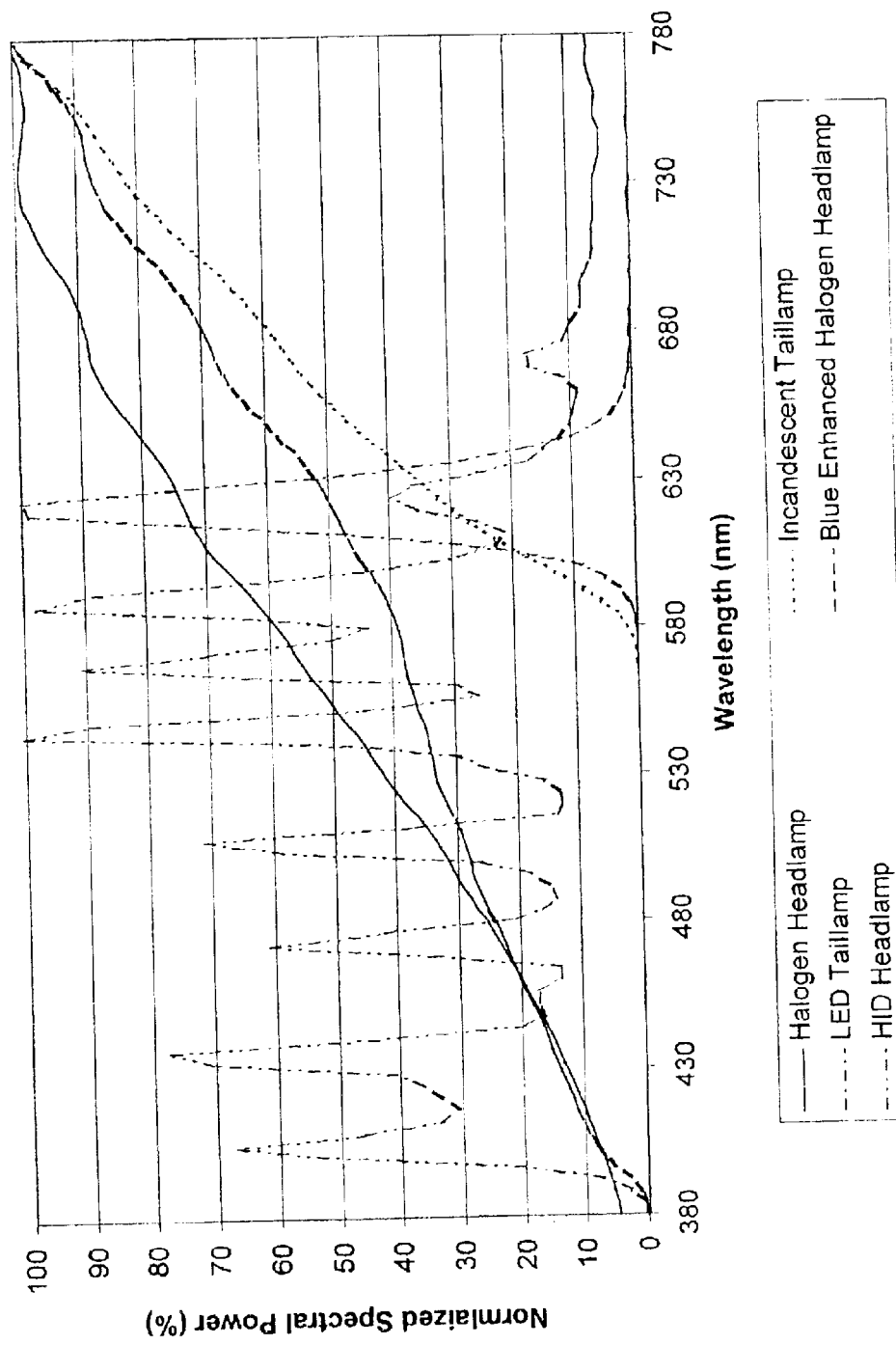
FIG. 10 depicts plots of the spectral distributions of various vehicle exterior lights.
Figure 11:
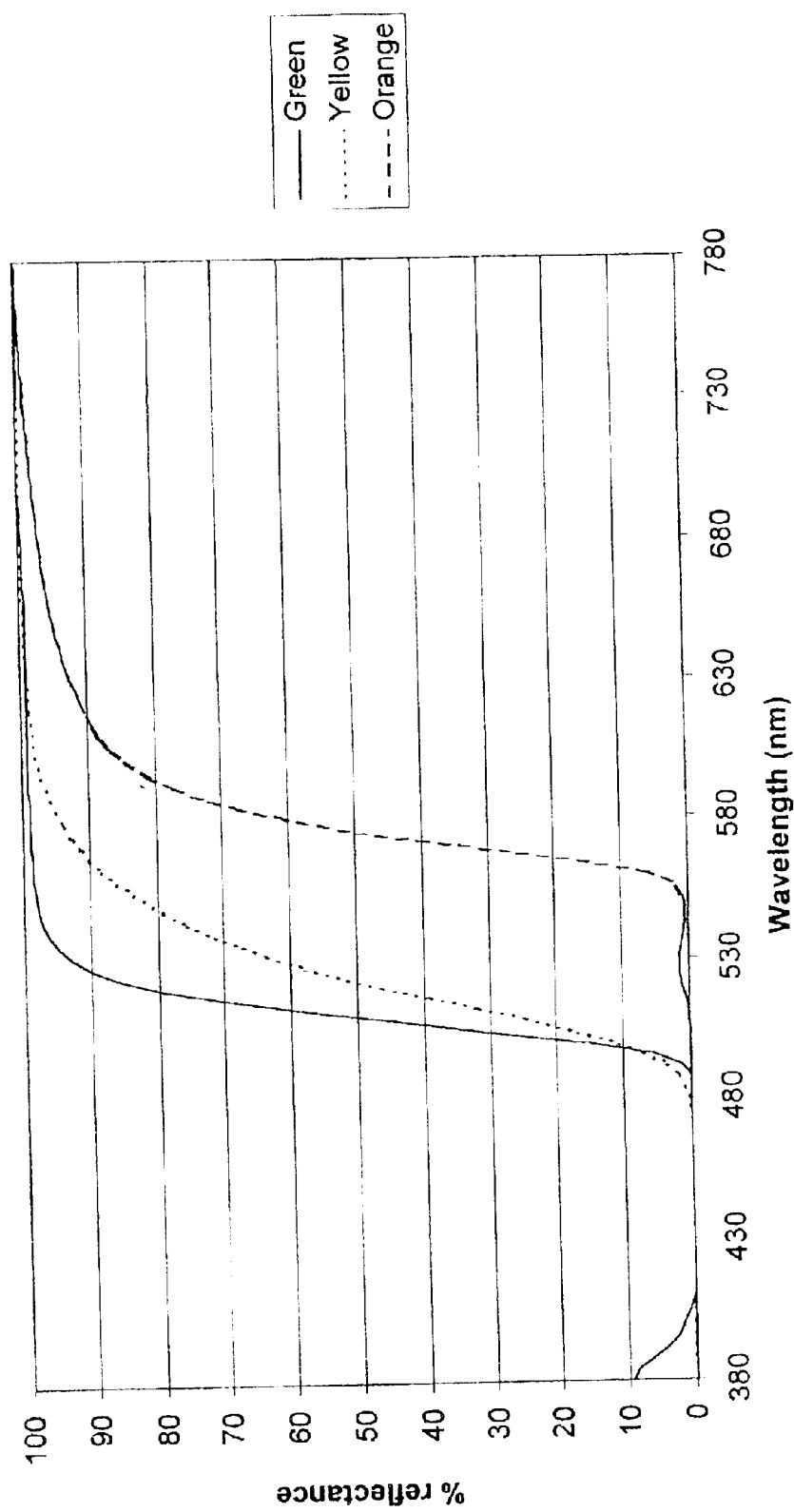
FIG. 11 depicts plots of the spectral reflectance ratios of various colored road signs.
Figure 12:
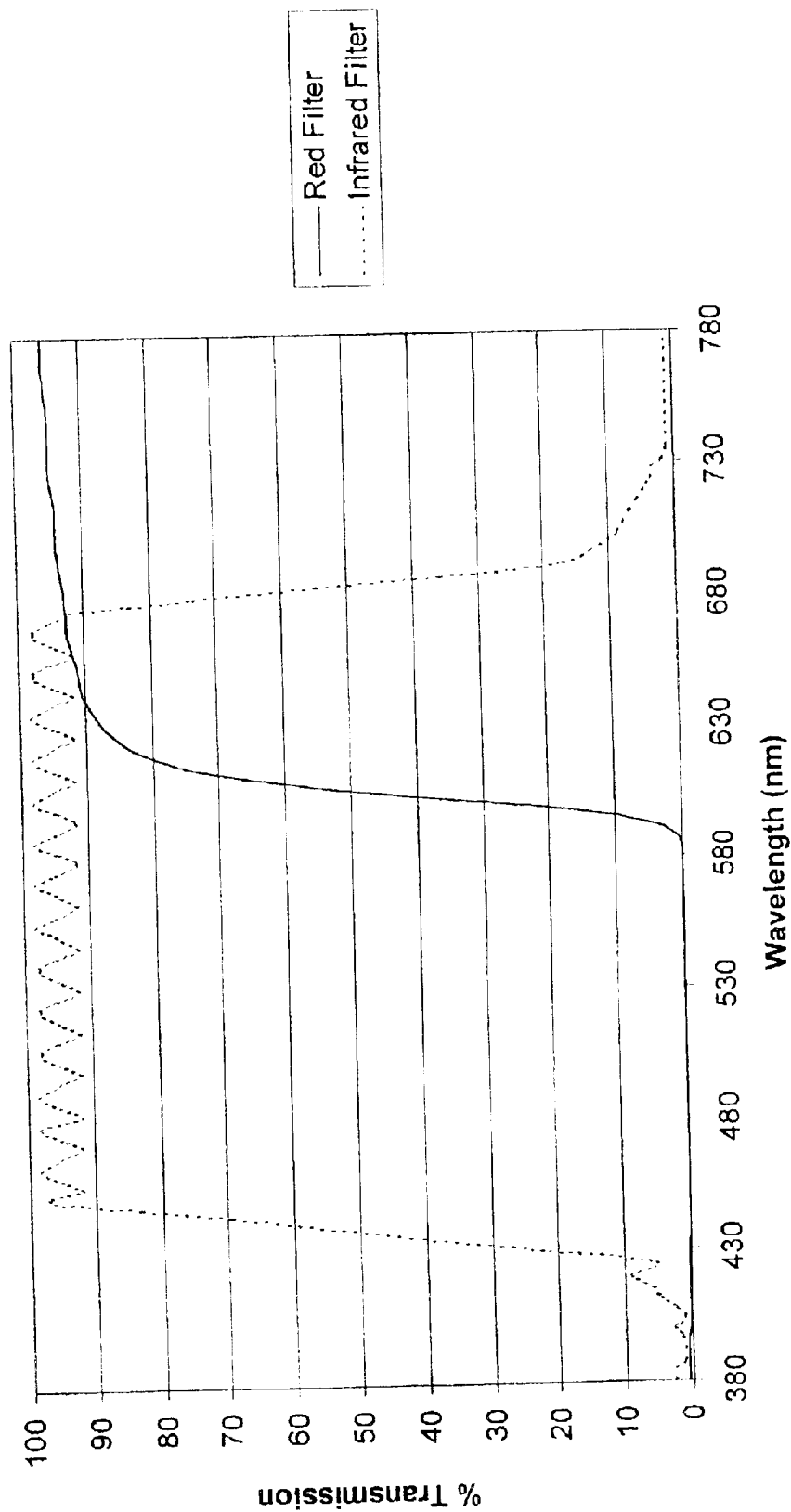
FIG. 12 depicts plots of transmission factors of red and infrared filter material, according to an embodiment of the present invention.
Figure 13:
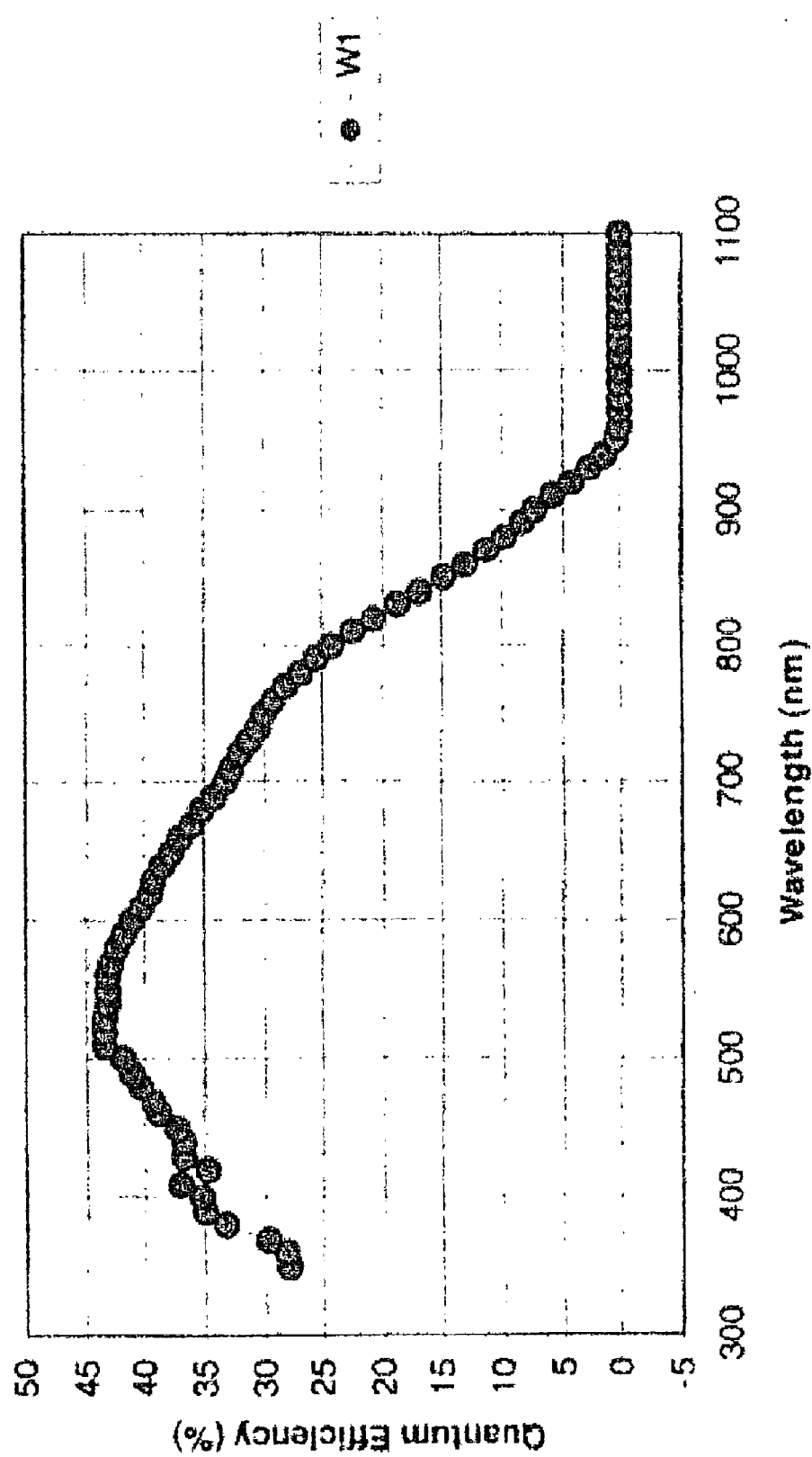
FIG. 13 depicts plots of the quantum efficiency versus wavelength for an optical system, according to an embodiment of the present invention.

10 depicts plots of the spectral content of different types of vehicular related light sources and FIG. 11 depicts plots of the spectral reflectance of various colored signs. FIG. 12 depicts plots of the percent transmission of red and infrared spectral filters used in one embodiment of the present invention and FIG. 13 depicts a plot of the quantum efficiency of an optical system in accordance with an embodiment of the present invention. Numerical data depicted by the plots of FIGS. 10–13 is utilized, as described in further detail below, to categorize various light sources.

The brightness of a given detected light source can be estimated by multiplying the spectral output of the source, as shown in FIG. 10, by the infrared spectral filter transmission factor, as shown in FIG. 12, multiplied by the spectral response of the pixel array, as shown in FIG. 13. For red filtered pixels, this value is further multiplied by the transmission factor of the red spectral filter. The brightness of detected reflections from road signs can be estimated by multiplying the controlled vehicle's headlamp spectral output, as shown in FIG. 10, by the spectral reflectance factor of the sign, as shown in FIG. 11, the infrared spectral filter transmission factor, as shown in FIG. 12, and the spectral response of the optical system, as shown in FIG. 13. For red spectral filtered pixels, the preceding result is then multiplied by the red spectral filter transmission factor, as shown in FIG. 12.

Figure 14:
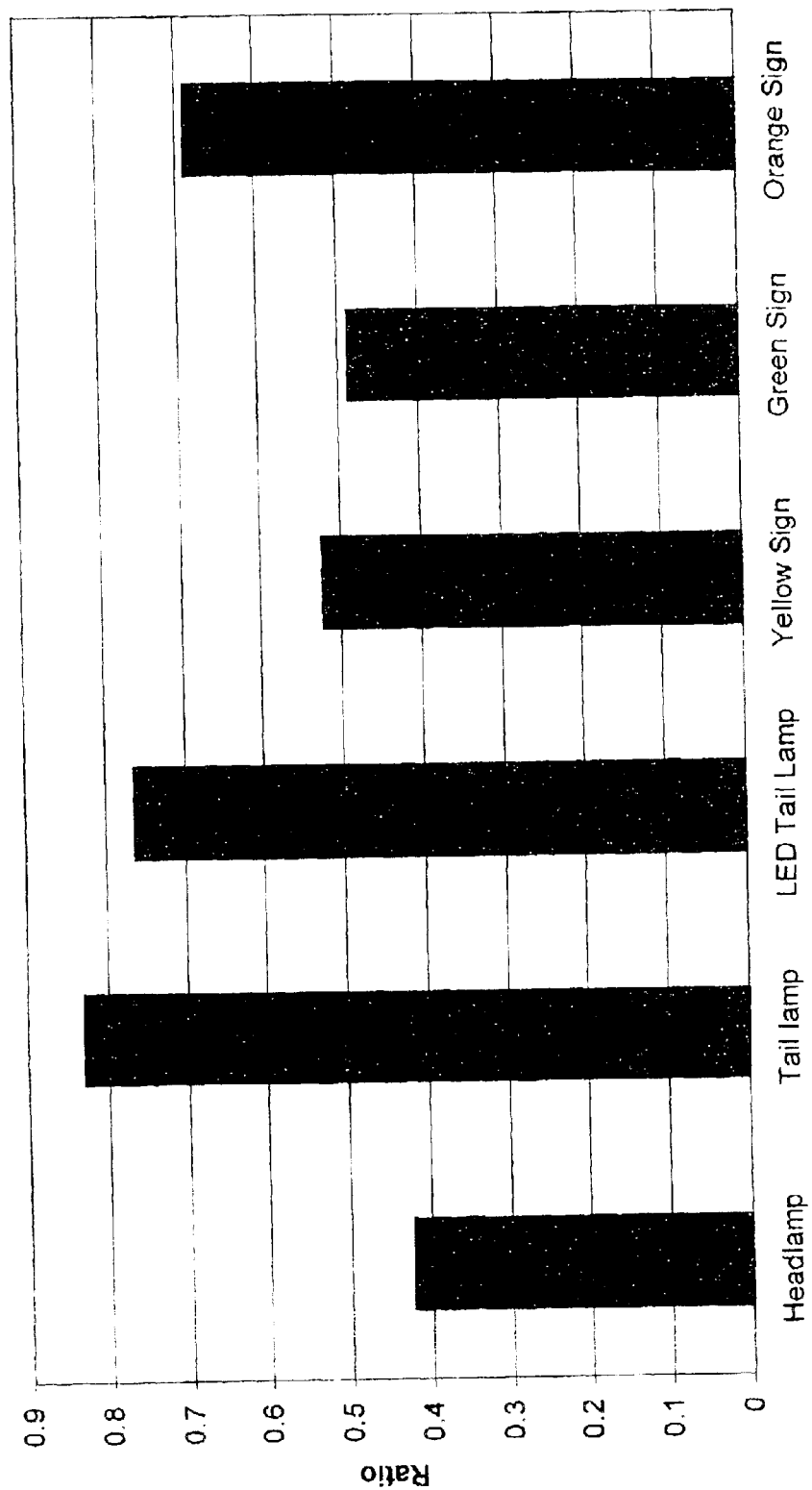
FIG. 14 depicts a graph of red-to-clear ratios for various light sources as detected by an optical system, according to an embodiment of the present invention.

The ratio in brightness between the object projected onto the red filtered pixels in relation to the object projected onto the non-red filtered pixels can be used to determine the relative redness of an object. This ratio can then be utilized to determine if the object is a tail lamp or a headlamp. FIG. 14 depicts the computed ratios of the brightness of objects projected onto red filtered pixels relative to those same objects projected onto the non-filtered pixels. As is shown in FIG. 14, tail lamps have a much higher red-to-clear ratio than headlamps, or most other objects.

Discrimination between light sources can be further improved with the use of blue-enhanced headlamps. Such headlamp bulbs are commercially available and produce a bluer, or cooler, color light that more closely approximates natural daylight. These headlamp bulbs are sometimes used in combination with high-intensity discharge (HID), low-beam lights to more closely match the color. Finally, halogen-infrared (HIR) bulbs, which contain a coating to reflect infrared light back into the bulb, have a cooler light output and may be used. HIR bulbs have the advantage of emitting less red light as a percentage of their total output, as shown in FIG. 10. As a result, the image of signs reflecting light will have a lower brightness on red filtered pixels than on non-red filtered pixels. Other light sources, which emit less red light in proportion to the total amount of light, may be advantageously used to minimize the false detection of road signs and reflections off of other objects; HID high-beam lights and LED headlamps are examples of such sources.

It is common to classify the color of white light sources (such as headlamps) by their color temperature or correlated color temperature. Light sources with a high color temperature have a more bluish hue and are, misleadingly, typically called "cool-white light" sources. Light sources with a more yellow or orangish hue have a lower color temperature and are, also misleadingly, called "warm white light" sources. Higher color temperature light sources have a relatively higher proportion of short wavelength visible light to long wavelength visible light. The present invention can benefit from the use of higher color temperature headlamps due to the reduced proportion of red light that will be reflected by signs or other objects that could potentially be detected.

Correlated color temperature for non-perfect Planckian sources can be estimated by computing the color coordinates of the light source and finding the nearest temperature value on the Planckian locus. Calculation of color coordinates is well known in the art. The text entitled MEASURING COLOUR, second edition, by R. W. G. Hunt, incorporated in its entirety herein by reference, is one source for known teachings in the calculation of color coordinates. Using the CIE 1976 USC (u', v') color space, a standard halogen headlamp was measured to have color coordinates of u'=0.25 & v'=0.52. From these coordinates, a correlated color temperature of 3100 Kelvin is estimated. The blue-enhanced headlamp of FIG. 10 has color coordinates of u'=0.24 and v'=0.51 and, thus, a correlated color temperature of approximately 3700 Kelvin. A measured high-intensity discharge (HID) headlamp has color coordinates of u'=0.21 and v'=0.50 and, thus, a correlated color temperature of 4500 Kelvin. In general, the present invention can benefit when the controlled vehicle is equipped with headlamps having a correlated color temperature above about 3500 Kelvin.

Figure 15A:
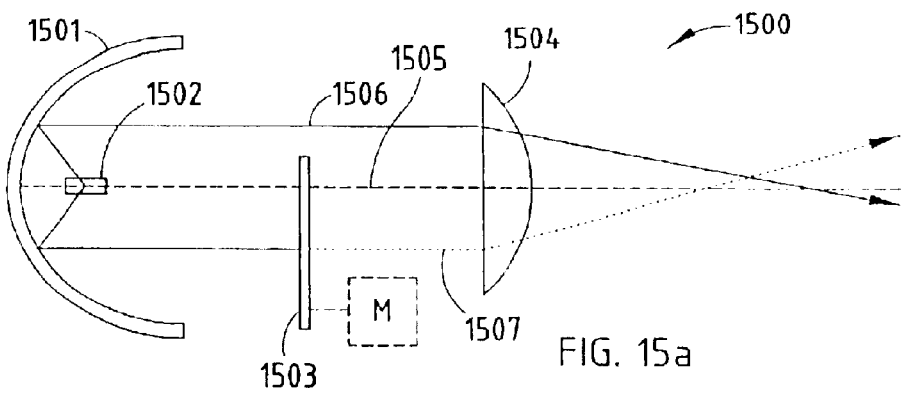
FIG. 15A is a side view of a headlamp that implements a rotatable mask, according to one embodiment of the present invention.

FIG. 15A schematically illustrates a headlamp 1500, which includes a rotatable mask 1503 and a bulb 1502 that is positioned in front of a reflector 1501. The bulb 1502 may be of a conventional incandescent (e.g., tungsten-halogen) type, high-intensity discharge (HID) type or other suitable bulb type, or may be the output from a remote light source as is described above. A lens 1504 directs light from the bulb 1502 and reflected by the reflector 1501 down the road. The mask 1503 establishes a cutoff point to prevent light vertically above the horizon 1505 from being directed down the road. The mask 1503 absorbs or reflects light rays, such as light ray 1507, which may cause glare to another vehicle and allows an illumination pattern provided by the headlamp 1500 to be changed. Light rays, such as light ray 1506, which project below the cutoff point, pass through lens 1504 as they are not blocked by the mask 1503.

Figure 15B:
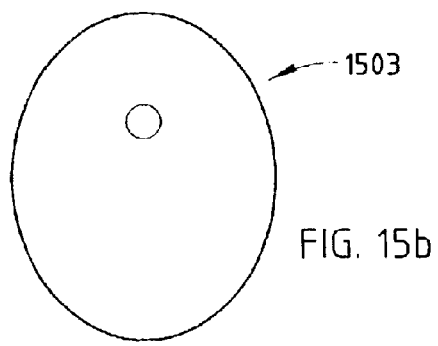
FIG. 15B is a front view of the mask of FIG. 15A.

The mask 1503, may have a number of different shapes, such as the oval shown in FIG. 15B, and may be implemented as an irregular cylinder that is coupled to a motor M, e.g., a stepper-motor, off-center so as to achieve a variable illumination pattern as the mask 1503 is rotated, i.e., the mask 1503 changes how much light is blocked as it is rotated. In this manner, the mask 1503 can provide an oblong profile in the vertical direction, when the mask 1503 is implemented as an oval cylinder.

In a typical illumination system that implements the headlamp 1500, a control unit receives electrical signals from a sensor array and controls the rotated position of the mask 1503, by sending control signals to the motor M, to achieve a desired illumination pattern. It should be appreciated that a homing or feedback technique may be employed to assure that the mask 1503 is in a known position and, thus, able to provide a desired illumination pattern. As the mask 1503 is rotated the amount of light that is attenuated by the mask 1503 changes and in this manner the movement of the mask 1503 can be used to establish a wide variety of different lighting functions. Since the rotation of the mask 1503 can be used to establish a vertical aim of the headlamp 1500, vehicle pitch variation compensation, as described herein above, can also be achieved. This technique of aiming a headlamp is advantageous as only the relatively small mask 1503 requires movement, rather than the entire lamp set which is moved in some commercially available auto-leveling systems.

Figure 16A:
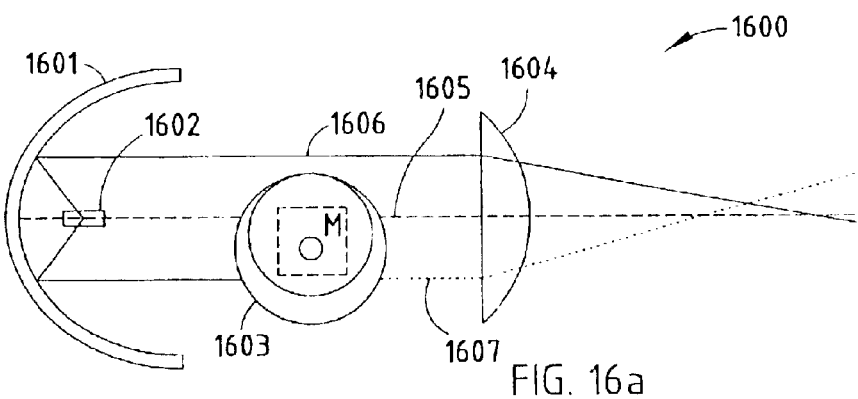
FIG. 16A is a side view of a headlamp that implements a rotatable mask, according to another embodiment of the present invention.

FIG. 16A schematically illustrates a headlamp 1600, which includes a rotatable mask 1603 that includes a plurality of profiles, according to another embodiment of the present invention. These profiles allow an illumination pattern to be controlled in both horizontal and vertical directions. The headlamp 1600 includes a bulb 1602 that is placed in front of a reflector 1601. The bulb 1602 may be of a conventional incandescent (e.g., tungsten-halogen) type, high-intensity discharge (HID) type or other suitable bulb type, or may be the output from a remote light source as is described above. A lens 1604 directs light from the bulb 1602 and reflected by the reflector 1601 down the road. The mask 1603 establishes a cutoff point to prevent light above the horizon 1605 from being directed down the road. The mask 1603 absorbs or reflects light rays, such as light ray 1607, which would cause glare to another vehicle. Light rays, such as light ray 1606, which project below the cutoff point, pass through the lens 1604 as they are not blocked by the mask 1603.

Figure 16B:
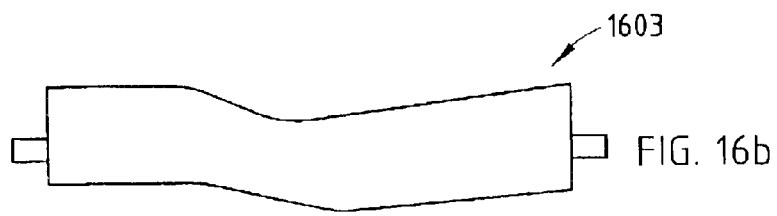
FIG. 16B is a front view of the mask of FIG. 16A in a first position.
Figure 16C:
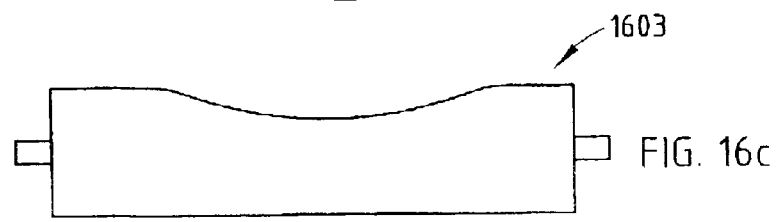
FIG. 16C is a front view of the mask of FIG. 16A in a second position.

The mask 1603 may simultaneously have a number of different incorporated profiles, such as the profiles shown in FIGS. 16B and 16C, and is coupled to a motor M, e.g. a stepper-motor, at an end so as to achieve a variable illumination pattern as the mask 1603 is rotated to select a desired profile. For example, by providing different horizontal profiles one can effect where light is aimed, e.g., left or right, and/or change the width of a light beam. Similar to the headlamp 1500, the headlamp 1600 may function with a control unit that receives electrical signals from a sensor array and controls the rotated position of the mask 1603, by sending control signals to the motor M, to achieve a desired illumination pattern. It should be appreciated that a homing or feedback technique may also be employed to assure that the mask 1603 is in a known position and, thus, able to provide a desired illumination pattern.

As with the rotation of the mask 1503, the rotation of the mask 1603 can also be used to establish different lighting functions, such as town or motorway lighting, or to increase the illumination range gradually with increased speed. Additionally, the rotation of the mask 1603 can also be used to establish both vertical and horizontal aim of the headlamp and therefore also compensate for vehicle pitch variations, as described herein above. This method of aiming the headlamp is also advantageous due to the fact that only the relatively small mask 1603 requires rotation.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A system for controlling at least one exterior vehicle light of a controlled vehicle, the system comprising:
   an array of sensors capable of detecting light levels in front of the controlled vehicle; and
   a control unit in communication with the array of sensors and the at least one exterior vehicle light, the control unit determining an estimated distance and an angle from the at least one exterior vehicle light of the controlled vehicle to a leading vehicle, wherein the control unit is operable to control operation of the at least one exterior vehicle light as a function of the estimated distance and angle based on output from the array of sensors and prevent the at least one exterior vehicle light from providing a disruptive glare to a driver of the leading vehicle.

2. The system of claim 1, wherein the at least one exterior vehicle light includes two low-beam headlamps.

3. The system of claim 1, wherein the control unit prevents the disruptive glare by causing the at least one exterior vehicle light to be one of aimed downward and reduced in intensity.

4. The system of claim 1, wherein the control unit determines the estimated distance to a leading vehicle by determining one of the brightness of a tail lamp of the leading vehicle, determining the estimated distance between two tail lamps of the leading vehicle and utilizing an output signal provided by one of a radar, laser and ultrasonic sensor.

5. The system of claim 1, wherein the array of sensors is a two-dimensional array of sensors that is incorporated within a camera.

6. An illumination control system for controlling at least one exterior vehicle light of a controlled vehicle, the system comprising:
   an array of sensors for generating electrical signals; and
   a control unit in communication with the at least one exterior vehicle light and operable to acquire and process electrical signals received from the array of sensors to determine an illumination gradient associated with the at least one exterior vehicle light on a road surface, the control unit comparing a sensed illumination range, which is based on the illumination gradient, to a desired illumination range and being operable to control the at least one exterior vehicle light to achieve the desired illumination range.

7. The system of claim 6, wherein the at least one exterior vehicle light includes two low-beam headlamps.

8. The system of claim 6, wherein the control unit achieves the desired illumination range and prevents disruptive glare by controlling at least one of an aim and intensity of the at least one exterior vehicle light.

9. The system of claim 6, wherein the control unit determines a distance to a leading vehicle by at least one of determining the brightness of a tail lamp of the leading vehicle, determining the distance between two tail lamps of the leading vehicle and utilizing an output signal provided by one of a radar, laser and ultrasonic sensor.

10. The system of claim 6, wherein the array of sensors is a two-dimensional array of sensors.

11. The system of claim 6, wherein the desired illumination range is based on at least one of a constant, a controlled vehicle speed, an ambient light level, weather conditions, a presence of another vehicle, an absence of another vehicle and a type of roadway.

12. An illumination control system for controlling at least one exterior vehicle light of a controlled vehicle, the system comprising:
   a light sensor for generating electrical signals; and
   a control unit in communication with the at least one exterior vehicle light and operable to acquire and process electrical signals received from the light sensor to determine when the at least one exterior vehicle light should transition to a town lighting mode, wherein the light sensor provides an indication of an AC component present in ambient light, and wherein the control unit causes the at least one exterior vehicle light to transition to the town lighting mode when the AC component exceeds a predetermined AC component threshold.

13. The system of claim 12, wherein the at least one exterior vehicle light includes two low-beam headlamps.

14. The system of claim 12, further including:
   a vehicle speed sensor coupled to the control unit and providing an indication of a speed of the controlled vehicle, wherein the control unit only causes the at least one exterior vehicle light to transition to the town lighting mode when the speed of the controlled vehicle is below a controlled vehicle speed threshold.

15. An illumination control system for controlling at least one exterior vehicle light of a controlled vehicle, the system comprising:
an imaging system for obtaining an image to a front of the controlled vehicle, the imaging system including an array of sensors each generating electrical signals representing a light level sensed by the sensor; and
a control unit in communication with the at least one exterior vehicle light and operable to acquire electrical signals received from the array of sensors and to separately process the electrical signals, wherein the control unit is operable to examine a position and brightness of an on-coming vehicle headlamp over time, as indicated by the electrical signals provided by the array of sensors to determine when a median width is appropriate for the activation of a motorway lighting mode, and wherein the control unit causes the at least one vehicle light to transition to the motorway lighting mode responsive to the determined median width.

16. The system of claim 15, wherein the at least one exterior vehicle light includes two low-beam headlamps.

17. An illumination control system for controlling at least one exterior vehicle light of a controlled vehicle, the system comprising:
an imaging system for obtaining an image to a front of the controlled vehicle, the imaging system including an array of sensors each generating electrical signals representing a light level sensed by the sensor;
a spatially controlled variable attenuating filter positioned proximate the at least one exterior vehicle light; and
a control unit in communication with the at least one exterior vehicle light and the attenuating filter, wherein the control unit is operable to acquire electrical signals received from the array of sensors and to process the electrical signals and control the attenuating filter to vary an illumination range of the at least one exterior vehicle light in response to the electrical signals, and wherein the control unit is operable to control the attenuating filter to distinguish between vehicular and non-vehicular light sources.

18. The system of claim 17, wherein the attenuating filter is one of a liquid crystal device and an electrochromic device.

19. The system of claim 17, wherein the attenuating filter is controlled to vary the direction of the at least one exterior vehicle light in response to the electrical signals.

20. The system of claim 17, wherein the array of sensors is incorporated within a camera.

21. An illumination control system for controlling at least one exterior vehicle light of a controlled vehicle, the system comprising:
an imaging system for obtaining an image to a front of the controlled vehicle, the imaging system including an array of sensors each generating electrical signals representing a light level sensed by the sensor;
a spatially controlled reflector positioned proximate the at least one exterior vehicle light; and
a control unit in communication with the at least one exterior vehicle light and the reflector, wherein the control unit is operable to acquire electrical signals received from the array of sensors and to process the electrical signals and control the reflector to vary an illumination range of the at least one exterior vehicle light in response to the electrical signals, and wherein the control unit is operable to control the reflector to distinguish between vehicular and non-vehicular light sources.

22. The system of claim 21, wherein the reflector is a metal-hydride switchable mirror.

23. The system of claim 21, wherein the reflector is a digital micro-mirror device.

24. The system of claim 21, wherein the reflector is also controlled to vary the direction of the at least one exterior vehicle light in response to the electrical signals.

25. The system of claim 21, wherein the array of sensors is incorporated within a camera.

26. The system of claim 21, wherein the at least one exterior vehicle light is a headlamp and the reflector is incorporated within the headlamp.

27. A system for controlling at least one headlamp of a controlled vehicle, the system comprising:
an array of sensors capable of detecting light levels in front of the controlled vehicle; and
a control unit in communication with the array of sensors and the at least one headlamp, the headlamp having a high color temperature and the control unit receiving data representing the light levels detected by the array of sensors to identify potential light sources, the control unit distinguishing light that is emitted from the headlamp and reflected by an object from other potential light sources, wherein the control unit is operable to control operation of the at least one headlamp as a function of the light levels output from the array of sensors.

28. The system of claim 27, wherein the color temperature is greater than 3500 Kelvin.

29. The system of claim 27, wherein the color temperature is 3700 Kelvin.

30. The system of claim 27, wherein the color temperature is greater than 4500 Kelvin.

31. The system of claim 27, wherein the at least one headlamp is a high-intensity discharge headlamp.

32. The system of claim 27, wherein the at least one headlamp is at least one light emitting diode.

33. The system of claim 27, wherein the at least one headlamp is a halogen-infrared headlamp.

34. The system of claim 27, wherein the at least one headlamp is a halogen headlamp.

35. The system of claim 27, wherein the at least one headlamp is a blue-enhanced halogen headlamp.

36. The system of claim 1, wherein the at least one exterior light includes at least one headlamp, and wherein the at least one headlamp provides the illumination at more than two distinct beam patterns.

37. The system of claim 36, wherein the array of sensors is a two-dimensional array of sensors that is incorporated within a camera.

38. A control system for controlling at least one exterior vehicle light of a controlled vehicle, the system comprising:
a processor; and
a memory subsystem for storing processor executable code coupled to the processor, the processor executable code when executed causing the processor to perform the steps of:
determining a distance and an angle from the at least one exterior vehicle light of the controlled vehicle to a leading vehicle based on output from an array of sensors; and
controlling the operation of the at least one exterior vehicle light as a function of the distance and angle to prevent the at least one exterior vehicle light from providing a disruptive glare to a driver of the leading vehicle.

39. The system of claim 38, wherein the processor prevents the disruptive glare by causing the at least one exterior vehicle light to be one of aimed downward and reduced in intensity.

40. The system of claim 38, wherein the processor determines the distance to a leading vehicle by determining one of the brightness of a tail lamp of the leading vehicle, determining the distance between two tail lamps of the leading vehicle and utilizing an output signal provided by one of a radar, laser and ultrasonic sensor.

41. A control system for controlling at least one exterior vehicle light of a controlled vehicle, the system comprising:
a processor; and
a memory subsystem for storing processor executable code coupled to the processor, the processor executable code when executed causing the processor to perform the steps of:
determining an illumination gradient associated with the at least one exterior vehicle light on a road surface based on output from an array of sensors;
comparing a sensed illumination range, which is based on the illumination gradient, to a desired illumination range; and
controlling the at least one exterior vehicle light to achieve the desired illumination range.

42. The system of claim 41, wherein the processor achieves the desired illumination range and prevents disruptive glare by controlling at least one of an aim and intensity of the at least one exterior vehicle light.

43. The system of claim 41, wherein the processor determines a distance to a leading vehicle by at least one of determining the brightness of a tail lamp of the leading vehicle, determining the distance between two tail lamps of the leading vehicle and utilizing an output signal provided by one of a radar, laser and ultrasonic sensor.

44. The system of claim 41, wherein the desired illumination range is based on at least one of a constant, a controlled vehicle speed, an ambient light level, weather conditions, a presence of another vehicle, an absence of another vehicle and a type of roadway.

45. A control system for controlling at least one exterior vehicle light of a controlled vehicle, the system comprising:
a processor; and
a memory subsystem for storing processor executable code coupled to the processor, the processor executable code when executed causing the processor to perform the steps of:
examining a position and brightness of an on-coming vehicle headlamp over time, as indicated by electrical signals provided by an array of sensors, to determine when a median width is appropriate for the activation of a motorway lighting; and
causing the at least one vehicle light to transition to the motorway lighting mode responsive to the determined median width.

46. A control system for controlling at least one exterior vehicle light of a controlled vehicle, the system comprising:
a processor; and
a memory subsystem for storing processor executable code coupled to the processor, the processor executable code when executed causing the processor to perform the steps of:
receiving electrical signals from an array of sensors;
controlling a spatial light modulator (SLM) to vary an illumination pattern of the at least one exterior vehicle light in response to the received electrical signals; and
controlling the SLM to distinguish between vehicular and non-vehicular light sources.

47. The system of claim 47, wherein the SLM is also controlled to provide redirected light to a portion of the SLM that is contributing to the illumination pattern provided by the at least one exterior light.

48. A method for controlling the forward lighting of a motor vehicle, comprising the steps of:
receiving a vehicular input that includes at least one of a vehicle turn rate, a vehicle wheel angle, a vehicle compass direction, a vehicle pitch, a vehicle location, and a weather condition;
determining a desired beam pattern based upon the vehicular input;
receiving an image of a forward field of view of the motor vehicle from an image sensor;
analyzing the received image; and
modifying the desired beam pattern based upon the analyzed image, wherein more than two distinct beam patterns can be provided.

49. The method of claim 48, wherein the analyzing step includes detecting oncoming or preceding vehicle light sources.

50. The method of claim 48, wherein the beam pattern is modified to prevent glare to detected oncoming or preceding vehicles.

51. The method of claim 48, wherein the analyzing step includes determining a light gradient on a road.

52. The method of claim 48, wherein the beam pattern is modified to achieve the desired illumination range based upon the light gradient on the road.

53. The system of claim 1, wherein the angle determined by said control circuit includes a vertical component.

54. The system of claim 1, wherein the at least one exterior vehicle light includes two low-beam headlamps, and wherein said control unit prevents disruptive glare by causing the low-beam headlamps to be aimed downward.

55. The system of claim 1, wherein the at least one exterior vehicle light includes two low-beam headlamps, and wherein said control unit prevents disruptive glare by causing the low-beam headlamps to be reduced in intensity.

56. The system of claim 12, wherein the control unit is operable to examine a position and brightness of an on-coming vehicle headlamp over time, as indicated by the electrical signals provided by the light sensor to determine when a median width is appropriate for the activation of a motorway lighting mode, and wherein the control unit causes the at least one vehicle light to transition to the motorway lighting mode responsive to the determined median width.

57. The system of claim 12, wherein the light sensor is a discrete light sensor.

58. The system of claim 15, wherein the control unit determines when the at least one exterior vehicle light should transition to a town lighting mode, wherein the array of sensors provides an indication of an AC component present in ambient light, and wherein the control unit causes the at least one exterior vehicle light to transition to the town lighting mode when the AC component exceeds a predetermined AC component threshold.

59. The system of claim 27 and further comprising a red filter for filtering the light incident on at least a portion of said array of sensors.

* * * * *

UNITED STATES PATENT AND TRADEMARK OFFICE
CERTIFICATE OF CORRECTION

PATENT NO. : 6,861,809 B2
DATED : March 1, 2005
INVENTOR(S) : Joseph S. Stam

It is certified that error appears in the above-identified patent and that said Letters Patent is hereby corrected as shown below:

Column 24,
Line 3, "claim 47" should be -- claim 46 --.

Signed and Sealed this

Thirty-first Day of May, 2005

JON W. DUDAS
*Director of the United States Patent and Trademark Office*